United States Patent [19]
Arai et al.

[11] Patent Number: 5,416,515
[45] Date of Patent: * May 16, 1995

[54] VIDEO CAMERA AND PHOTOMETRIC METHOD THEREIN, IMAGE PICK-UP APPARATUS AND METHOD, AND PHOTOMETRIC METHOD AND FOCUSING CONTROL METHOD IN SAID IMAGE PICK-UP APPARATUS

[75] Inventors: Minoru Arai; Kiyotaka Kaneko; Takashi Soga; Shigekazu Fukada; Tadashi Fujii; Izumi Miyake, all of Asaka, Japan

[73] Assignee: Fuji Photo Film Co., Ltd., Kanagawa, Japan

[ * ] Notice: The portion of the term of this patent subsequent to Dec. 27, 2011 has been disclaimed.

[21] Appl. No.: 126,330

[22] Filed: Sep. 24, 1993

[30] Foreign Application Priority Data

Sep. 28, 1992 [JP] Japan .................................. 4-281065
Dec. 22, 1992 [JP] Japan .................................. 4-356410

[51] Int. Cl.$^6$ .......................................... H04N 5/232
[52] U.S. Cl. .................................. 348/229; 348/234; 348/297
[58] Field of Search ...................... 358/41, 43, 44, 227, 358/909, 527; 354/402; H04N 5/232; 348/221, 229, 234-236, 238, 264, 345, 348, 354, 355, 362, 364, 297

[56] References Cited

U.S. PATENT DOCUMENTS

| | | | |
|---|---|---|---|
| 4,614,974 | 9/1986 | Toyama ............................ | 358/227 |
| 5,049,983 | 9/1991 | Matsumoto et al. ............... | 358/44 |
| 5,077,613 | 12/1991 | Hirao et al. ....................... | 358/227 |
| 5,185,658 | 2/1993 | Shinomiya ......................... | 358/44 |
| 5,200,828 | 4/1993 | Jang et al. . | |
| 5,282,075 | 1/1994 | Sugimori .......................... | 348/229 |

FOREIGN PATENT DOCUMENTS

553850A1 1/1993 European Pat. Off. .

Primary Examiner—Edward L. Coles, Sr.
Assistant Examiner—Kim Yen Vu

[57] ABSTRACT

In a method of and apparatus for split photometry, a plurality of split photometric areas are established by setting a plurality of horizontal and vertical photometric intervals respectively within intervals in a horizontal scanning direction and a vertical scanning direction of the solid-state electronic image sensing device. An extracted luminance-signal component is integrated over a horizontal integration interval designated by an integration control signal. Integrated values obtained by the integration operation are summed, in every split photometric area, over the corresponding vertical photometric interval, and a photometric value is calculated for every split photometric area based upon the value obtained by summing the integrated values in another embodiment, data for controlling exposure or controlling the focusing of an image pick-up lens can be obtained for each of a plurality of blocks set in a photographic area. From data representing the image of a subject, a luminance signal is generated and converted into digital luminance data which is applied to a gate array. The luminance data is summed block by block in the gate array and the summed data is outputted in block units. Only the necessary data is selected from the summed luminance data of every block and a photometric value is calculated. A diaphragm and an electronic shutter is controlled based upon the photometric value calculated. A high-frequency component signal for focusing control can be calculated for each and every block in a similar manner.

20 Claims, 18 Drawing Sheets

*Fig. 6*

INTEGRATED-DATA STORAGE AREAS FOR SPLIT PHOTOMETRY

| 1st | 2nd | 3rd | 4th | 5th |
|-----|-----|-----|-----|-----|
| 6th | 7th | 8th | 9th | 10th |
| 11th | 12th | 13th | 14th | 15th |

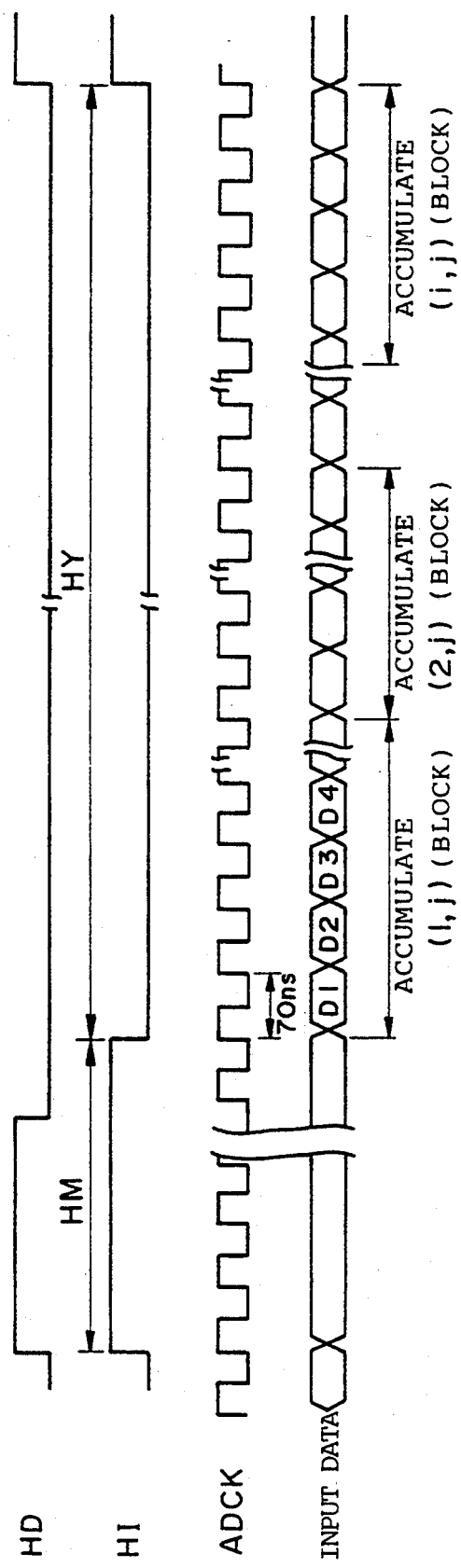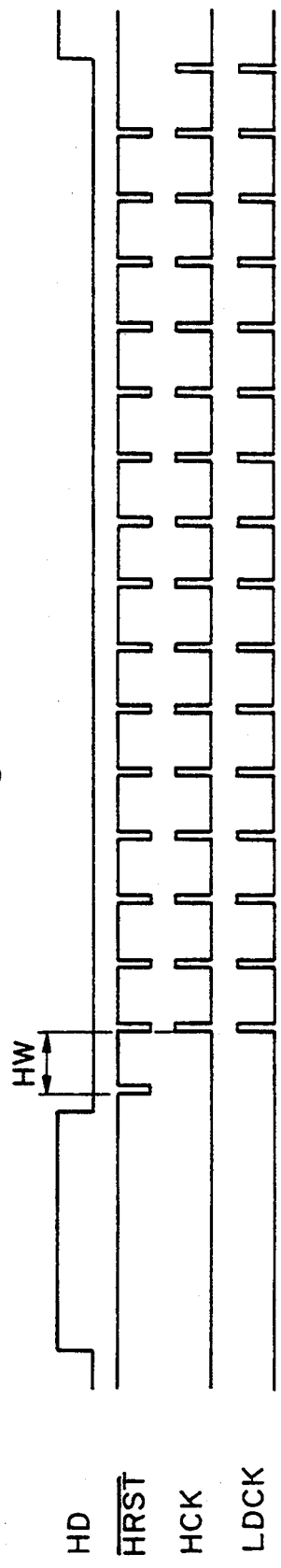

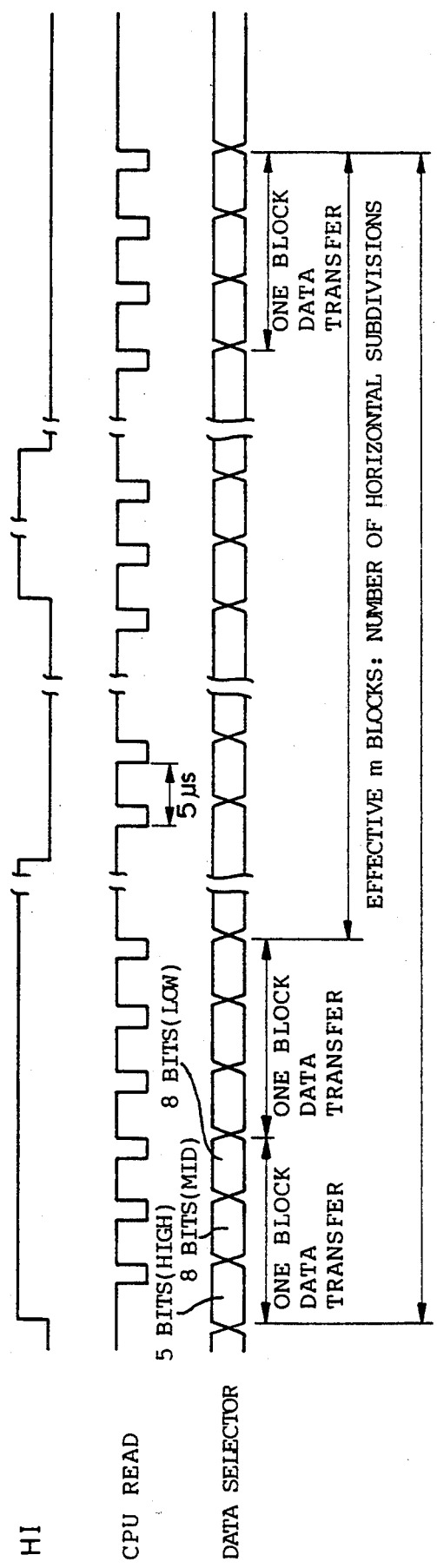

Fig. 17

| FEED(μm) OF IMAGE PICK-UP LENS | SUMMED DATA |
|---|---|
| 0 | |
| 10 | |
| 20 | |
| 30 | |
| 40 | |
| 50 | |

# 5,416,515

VIDEO CAMERA AND PHOTOMETRIC METHOD THEREIN, IMAGE PICK-UP APPARATUS AND METHOD, AND PHOTOMETRIC METHOD AND FOCUSING CONTROL METHOD IN SAID IMAGE PICK-UP APPARATUS

BACKGROUND OF THE INVENTION

1. Field of the Invention

This invention relates to a video camera (a still-/movie video camera) in which exposure conditions are decided upon performing photometry of a subject using a video signal obtained from a solid-state electronic image sensing device, and a method of photometry used in this video camera. More particularly, the invention relates to a video camera for performing split photometry and a method of split photometry used in this video camera.

The invention relates further to an image pick-up apparatus for photographing a subject using a solid-state electronic image sensing device and outputting a video signal or image data representing the subject, as in the manner of a video camera, a method of photometry and a method of focusing control used in this apparatus, as well as an image pick-up method.

2. Description of the Background Art

Photometry is required in order to determine exposure conditions in a camera having an automatic exposure (so-called "AE") function. In a case where the luminance of a subject in a photographic area differs greatly from one location to another, as in a case where photography is performed under backlighted conditions, it is necessary to obtain a photometric value for every location on the subject (every portion thereof) and carry out exposure control conforming to the photometric values. To achieve this, it is known to use so-called split photometry, in which the photographic area is subdivided into a plurality of small areas and a photometric value is obtained for each small area.

Split photometry is performed using a photometric element, which is specifically used for split photometry, having a plurality of subdivided light-receiving areas. When this special photometric Element is used, however, a problem encountered is that the split photometric areas are fixed and cannot be changed as necessary.

Accordingly, it may be considered to perform split photometry utilizing a video signal outputted by a solid-state electronic image sensing device with which a video camera is equipped. In such an arrangement, however, a detecting circuit and A/D converter are required for each of the plurality of split photometric areas. This is an impediment in terms of obtaining a camera of small size, little power consumption and low cost. If photometric processing regarding one split photometric area is performed at intervals of one frame or one field, one set of the detector circuit and A/D converter will suffice. However, this will require more time for photometric processing and, hence, a longer period of time before actual photography can be performed.

On the other hand, in an image pick-up apparatus such as a video camera, photography of a subject is performed using a solid-state electronic image pick-up device (a CCD, for example). A solid-state electronic image pick-up device is capable of providing information indicative of the subject on a pixel-by-pixel basis. With a solid-state electronic image pick-up device having an array of 1280 pixels in the horizontal direction and 1024 pixels in the vertical direction, as much as about 1,300,000 items of information can be provided.

In a video camera equipped with a solid-state electronic image sensing device and adapted to obtain a video signal of a photographic subject, consideration may be given to a method of obtaining photometric values by integrating the video signal output from the solid-state electronic image sensing device over an appropriate photometric area as well as to a method of controlling the focusing of an image pick-up lens by integrating the video signal over an appropriate range-finding area. In order to improve accuracy in these methods, the general practice is to exclude portions in the photographic area in which the video signal saturates, if such portions exist.

Since a solid-state electronic image sensing device provides an item of information for each and every pixel, it is preferred in these methods of performing photometry and focusing control using a video signal that the discrimination of portions in which the video signal saturates, as well as the exclusion of these portions, be carried out for each and every pixel.

However, executing the processing of the video signal or image data on a pixel-by-pixel basis is impractical since such processing is difficult for a small-size microcomputer even when storage of the signal or data in an image memory is considered.

SUMMARY OF THE INVENTION

An object of the present invention is make it possible to simplify circuit constructions and to perform photometry in a short time in split photometry using a video signal obtained from a solid-state electronic image pick-up device.

Another object of the present invention is make it possible to obtain photometric data and data for focusing control of an image pick-up lens in block units larger than a pixel in a case where a photographic subject is photographed using a solid-state electronic image sensing device.

According to a first aspect of the present invention, there is provided a video camera having an image pick-up optical system which includes a solid-state electronic image sensing device for converting an incident light image into a video signal and outputting the video signal, comprising a split photometric-area setter for setting a plurality of split photometric areas in each of horizontal and vertical directions by setting a plurality of horizontal photometric intervals within an interval in a horizontal scanning direction of the solid-state electronic image sensing device and setting a plurality vertical photometric intervals within an interval in a vertical scanning direction of the solid-state electronic image sensing device; a luminance-signal extracts for extracting a luminance-signal component from the video signal outputted by the solid-state electronic image sensing device; an integrator for integrating the luminance-signal component, which has been extracted by the luminance-signal extractor, over a horizontal integration interval designated by an applied integration control signal and for outputting a signal representing an integrated value resulting from the integration; an integration controller for outputting, for every split photometric area, the integration control signal that designates, as the integration interval, the horizontal photometric interval of a split photometric area that is being scanned and for applying this integration control signal to the integrating means; and a photometric-value element for summing, in every split photometric area, and over the corresponding vertical photometric interval, integrated values obtained from the integrator, and for calculating a photometric value for every split photometric area based upon a value obtained by summing the integrated values.

A photometric method in a video camera according to first aspect of the present invention comprises a step of setting a plurality of split photometric areas in each of horizontal and vertical directions by setting a plurality of horizontal photometric intervals within an interval in a horizontal scanning direction of a solid-state electronic image sensing device, which converts an incident light image into a video signal and outputs the video signal, and setting a plurality of vertical photometric intervals within an interval in a vertical scanning direction of the solid-state electronic image sensing device; a step of designating, by an integration control signal, and as an integration interval, the horizontal photometric interval of a split photometric area that is being scanned; a step of extracting a luminance-signal component from the video signal outputted by the solid-state electronic image sensing device and integrating this luminance-signal component over the horizontal integration interval designated by the integration control signal; and a step of summing, in every split photometric area, and over the corresponding vertical photometric interval, integrated values obtained by the integration and calculating a photometric value for every split photometric area based upon a value obtained by summing the integrated values.

In accordance with the first aspect of the present invention, a plurality of mutually non-overlapping split photometric areas defined by a plurality of horizontal photometric intervals set in an interval of the horizontal scanning direction and a plurality of vertical photometric intervals set in an interval of the vertical scanning direction are set in a photographic area. Integration of the luminance-signal component extracted from the video signal is performed in every split photometric area using the horizontal photometric interval as the integration interval. The integrated values obtained by this integration operation are summed for every split photometric area, whereby a photometric value is obtained for every split photometric area. The photometric values may be calculated with regard to a group of split photometric areas composed of a combination of plural split areas determined in advance.

In accordance with the first aspect of the present invention, a single photometric processing cycle is concluded and a plurality of split photometric values can be obtained simultaneously in one field interval or one frame interval of the video signal outputted by the solid-state electronic image sensing device. As a result, photometric processing time is shortened, thus making it possible to shorten the photometric processing time required before actual photography can be performed. Further, according to the first aspect of the invention, it is sufficient to provide only a single set of photometric circuits (which includes the integrator) and an A/D converter used when digital data is necessary. As a result, the circuit arrangement is simplified and this contributes to a reduction in camera size, less power consumption and lower cost.

In a preferred embodiment of the first aspect of the invention, the video camera further comprises an A/D converter for converting the integrated signal outputted by the integrator into digital data, and an A/D conversion controller for performing control in such a manner that the data conversion by the A/D converter is carried out in a horizontal scanning interval that follows the horizontal scanning interval in which the integration operation by the integrator was performed.

In accordance with this embodiment, enough time for A/D conversion processing by the A/D converter is assured. This makes it possible to use a comparatively low-cost A/D converter (inclusive of a CPU of the type having an internal A/D converter), which does not always having a high A/D converting speed.

Thus, in accordance with the first aspect of the invention described above, split photometric values are obtained with regard to a plurality of split photometric areas or with regard to groups of split photometric areas each comprising a plurality of split photometric areas. As a result, exposure conditions can be established using the plurality of photometric values obtained. Even if the luminance of the picture in the field of view of the camera differs greatly from one portion to another, exposure conditions suited to these portions can be decided to make possible appropriate photography of the image.

An image pick-up apparatus according to a second aspect of the present invention comprises photographic circuitry, which includes a solid-state electronic image sensing device, for photographing a subject and outputting a video signal, which represents the subject, from the solid-state electronic image sensing device; a block setter for subdividing any area within a photographic area of the solid-state electronic image sensing device into a plurality of blocks; and an adder for summing each video signal, which is outputted by the photographic circuitry, in a range of a horizontal scanning interval and vertical scanning interval corresponding to each block that has been set by the block, and for outputting a summed video signal for every block.

An image pick-up method according to a second aspect of the present invention comprises a step of subdividing any area within a photographic area of a solid-state electronic image sensing device into a plurality of blocks; a step of photographing a subject using the solid-state electronic image sensing device and obtaining a video signal, which represents the subject, from the solid-state electronic image sensing device; and a step of summing each obtained video signal in a range of a horizontal scanning interval and vertical scanning interval corresponding to each block obtained by subdivision and outputting a summed video signal for every block.

In accordance with the second aspect of the present invention, any area within the photographic area of a solid-state electronic image sensing device is subdivided into a plurality of blocks, and the video signal representing the subject is summed block by block to obtain summed video signals. A summed video signal thus obtained possesses information corresponding to the particular block, and it is possible to carry out photometry, focusing control of an image pick-up lens and recognition of the subject by using the summed video signal.

Since processing of the video signal (inclusive of image data) need only be executed in block units, the amount of processing is less in comparison with a case in which processing is executed in pixel units, and such processing can be handled adequately by a small-size microcomputer.. Since information regarding the subject is obtained in block units, information indicative even of comparatively detailed portions of the subject can be obtained.

The pattern of the subject can be recognized with comparatively good definition from the information of each block, and photometric weighting can be performed in block units in conformity with the subject pattern. In addition, in accordance with recognition of the subject pattern, a rangefinding area can be limited solely to an area in which the main subject is present.

In a case where a photometric value is calculated based upon a video signal, whether or not the video signal has saturated can be determined in block units, and the video signal of a block in which saturation occurs can be excluded. This makes it possible to raise the accuracy of photometric values.

An image pick-up apparatus according to a third aspect of the present invention comprises photographic circuitry, which includes a solid-state electronic image sensing device, for photographing a subject and outputting a video signal, which represents the subject, from the solid-state electronic image sensing device; a block setter for subdividing any area within a photographic area of the solid-state electronic image sensing device into a plurality of blocks; a luminance-signal-component extracter for extracting a component relating to a luminance signal from the video signal outputted by the photographic circuitry, an adder for summing each component relating to the luminance signal, which is outputted by the luminance-signal-component extracter, in a range of a horizontal scanning interval and vertical scanning interval corresponding to each block that has been set by the block setter, and for outputting a summed luminance-signal component for every block, and a photometric-value element for calculating a photometric value based upon a summed luminance-signal component, which corresponds to a prescribed block, from among the summed luminance-signal components outputted by the adder.

A photometric method according to a third aspect of the present invention comprises a step of subdividing any area within a photographic area of a solid-state electronic image sensing device into a plurality of blocks; a step of photographing a subject using the solid-state electronic image sensing device and obtaining a video signal, which represents the subject, from the solid-state electronic image sensing device; a step of extracting a component relating to a luminance signal from the video signal obtained; a step of summing each component relating to the extracted luminance signal in a range of a horizontal scanning interval and vertical scanning interval corresponding to each block obtained from subdivision and obtaining a summed luminance-signal component for every block; and a step of calculating a photometric value based upon a summed luminance-signal component, which corresponds to a prescribed block, from among the summed luminance-signal components obtained.

In accordance with the third aspect of the invention, a component relating to a luminance signal is obtained in block units. Whether or not a luminance signal has saturated can be determined in block units, and the luminance signal of a block in which saturation occurs can be excluded. Accordingly, in a case where a photometric value is calculated from a luminance signal, the accuracy of the photometric value can be improved.

By recognizing the pattern of a subject and detecting an area in which light is to be metered predominately in detail, it is possible to subdivide this area into a plurality of blocks and then perform photometry. As a result, even minute photometry of a subject can be performed.

A component relating to a luminance signal includes not only a pure luminance signal but also a signal that may be regarded as a luminance signal, such as a G signal.

According to a fourth aspect of the present invention, there is provided an image pick-up apparatus having an image pick-up optical system which includes a solid-state electronic image sensing device for converting an incident light image into a video signal and outputting the video signal, and an image pick-up lens for forming an image of a subject on the solid-state electronic image sensing device, the apparatus comprising a block setter for subdividing any area within a photographic area of the solid-state electronic image sensing device into a plurality of blocks; a high-frequency signal component extracter for extracting a high-frequency signal component for focusing control from the video signal outputted by the solid-state electronic image sensing device; an adder for summing each high-frequency signal component, which is outputted by the high-frequency signal component extracter, in a range of a horizontal scanning interval and vertical scanning interval corresponding to each block that has been set by the block setter, and for outputting a summed high-frequency signal component for every block; and a focusing controller for performing focusing control of the image pick-up lens based upon a summed high-frequency signal component, which corresponds to a prescribed block, from among the summed high-frequency signal components outputted by the adder.

Further, according to a fourth aspect of the present invention, there is provided a focusing control method in an image pick-up apparatus having an image pick-up optical system which includes a solid-state electronic image sensing device for converting an incident light image into a video signal and outputting the video signal, and an image pick-up lens for forming an image of a subject on the solid-state electronic image sensing device, the method comprising a step of subdividing any area within a photographic area of the solid-state electronic image sensing device into a plurality of blocks; a step of extracting a high-frequency signal component for focusing control from the video signal outputted by the solid-state electronic image sensing device; a step of adding up each extracted high-frequency signal component in a range of a horizontal scanning interval and vertical scanning interval corresponding to each block obtained by subdivision and outputting a summed high-frequency signal component for every block; and a step of performing focusing control of the image pick-up lens based upon a summed high-frequency signal component, which corresponds to a prescribed block, from among the summed high-frequency signal components obtained.

In accordance with the fourth aspect of the invention, a high-frequency signal component is obtained in block units. Whether or not the high-frequency signal component has saturated can be determined in block units, and the high-frequency signal component of a block in which saturation occurs can be excluded. Accordingly, in a case where focusing control of an image pick-up lens is performed based upon a high-frequency signal component, highly precise focusing control is possible.

By recognizing a subject pattern, focusing control of the image pick-up lens can be performed with regard to a specific area.

An image pick-up apparatus according to a fifth aspect of the invention comprises photographic circuitry for photographing a subject and outputting image data representing the subject; block setter for subdividing any area within a photographic area of the photographic circuitry into a plurality of blocks; a horizontal accumulator for summing image data, which is outputted by the photographic circuitry, for every horizontal scanning region of the blocks set by the block setter, and for outputting, block by block, horizontal sum data obtained by this summing; a vertical accumulator having first memories, a number of which provided corresponding to a number of blocks in a horizontal direction set by the block setter; an adder for adding the horizontal sum data, which is outputted by the horizontal accumulator block by block, to stored data in the corresponding first memories, the vertical accumulator repeating the above-mentioned addition in a vertical scanning region of one block; and second memories, a number of which corresponding to a number of blocks in the horizontal direction set by the block setter, for accepting, block by block, results of accumulation regarding the vertical scanning region of one block obtained by the vertical accumulator, for temporarily storing these results and for successively outputting these results at fixed intervals.

Thus, image data is obtained on a block-by-block basis and it is possible to perform calculation of photometric values, focusing control of an image pick-up lens and subject recognition based upon luminance data and high-frequency signal-component data for each and every block.

An apparatus for generating multiple split-image information according to sixth aspect of the present invention generates accumulated image information for every block of blocks obtained by subdividing a prescribed area in one frame into a plurality of blocks in horizontal and vertical directions using one frame of inputted image data, the apparatus comprising a horizontal accumulating circuit for summing input image data for every horizontal scanning region of one block and for outputting horizontal sum data block by block; a vertical accumulating circuit having first memory circuits, the number of which corresponds to a number of blocks in the horizontal direction and an adding circuit for adding the horizontal sum data, which is outputted by the horizontal accumulating circuit block by block, to stored data in the corresponding first memory circuit, the vertical accumulating circuit repeating the above-mentioned addition in a vertical scanning region of one block; and second memory circuits, provided in number corresponding to the number of blocks in the horizontal direction, for accepting, block by block, results of accumulation regarding the vertical scanning region of one block obtained by the vertical accumulating circuit, temporarily storing these results and successively outputting these results at fixed intervals.

In accordance also with the sixth aspect of the invention, image data is obtained on a block-by-block basis and it is possible to perform calculation of photometric values, focusing control of an image pick-up lens and subject recognition based upon luminance data and high-frequency signal-component data for each and every block.

BRIEF DESCRIPTION OF THE DRAWINGS

Other features and advantages of the present invention will be apparent from the following description taken in conjunction with the accompanying drawings, in which like reference characters designate the same or similar parts throughout the figures thereof, which are given by way of illustration only and thus are not limitative of the present invention, and wherein:

FIG. 6 is a diagram illustrating the storage areas of a memory for storing integrated data representing split photometry;

FIGS. 14a, 14b are time charts illustrating data accumulation timing, these indicating parts of the time charts of FIGS. 13a, 13b shown enlarged in terms of time;

FIG. 15 is a time chart illustrating data transfer-output timing, this indicating parts of the time charts of FIGS. 13a, 13b shown enlarged in terms of time;

FIG. 17 illustrates an example of a memory in which data for focusing control is stored.

DESCRIPTION OF THE PREFERRED EMBODIMENTS

First Embodiment

A first embodiment in which a first aspect of the present invention is applied to digital still-video camera will now be described in-detail with reference to the drawings.

Figure 1:
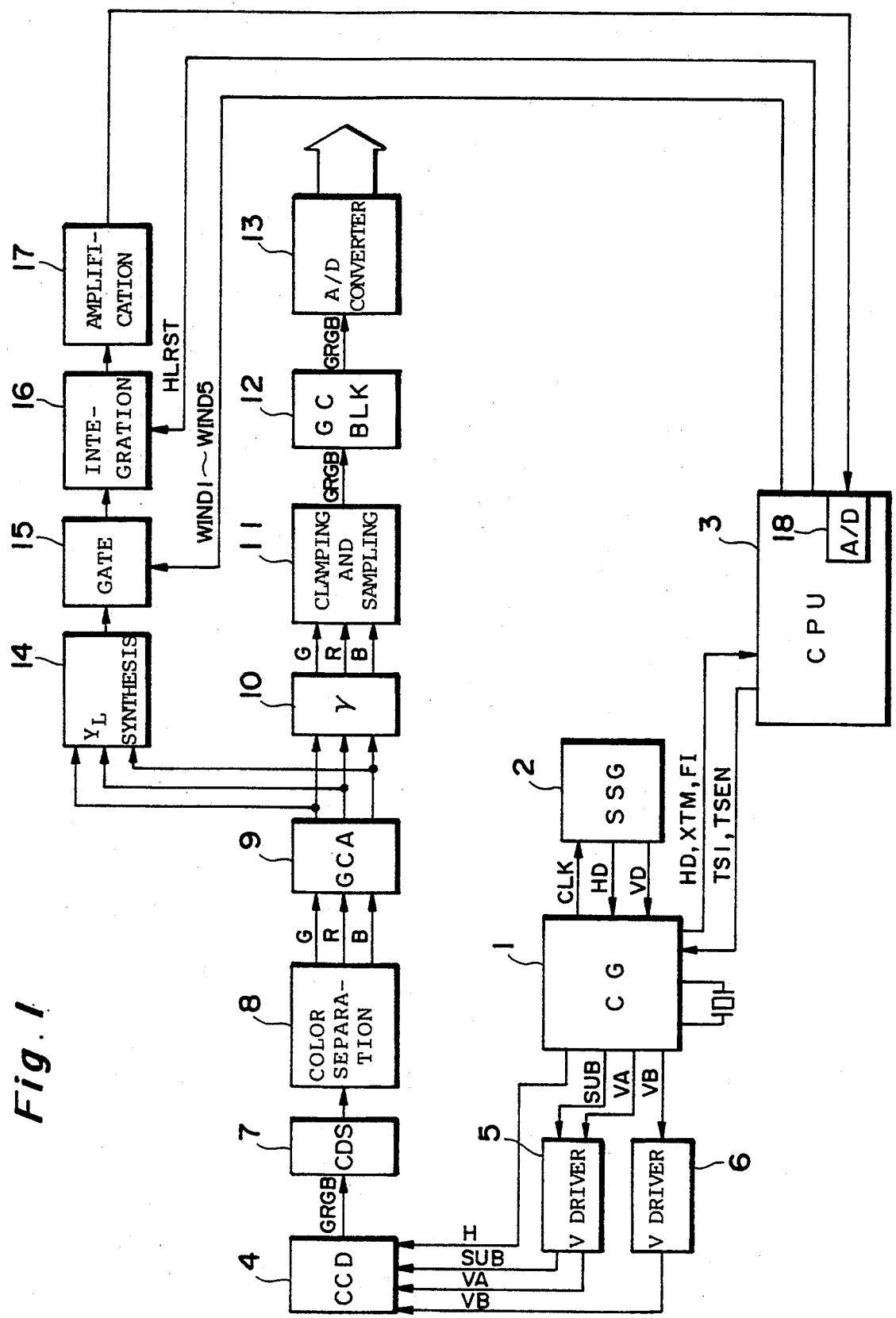
FIG. 1 is a block diagram illustrating the electrical configuration of a digital still-video camera according to an embodiment of the present invention.

FIG. 1 is a block diagram illustrating the electrical configuration of a digital still-video camera according to an embodiment of the present invention.

A clock-signal generating circuit (hereinafter referred to as a "CG") 1 generates a clock signal CLK, horizontal transfer pulses H for driving a horizontal transfer line of a CCD 4, substrate pulses SUB for sweeping out unnecessary charge, A-field vertical transfer pulses VA and B-field vertical transfer pulses VB. The CG 1 outputs a field index signal FI, an X-timing signal XTM for firing a strobe, and a horizontal synchronizing signal HD.

The clock signal CLK is applied to a synchronizing signal generating circuit (hereinafter referred to as an "SSG") 2, which generates a horizontal synchronizing signal HD and a vertical synchronizing signal VD based upon the clock signal CLK. The signals HD and VD are applied to the CG 1.

The horizontal transfer pulses H are applied to the CCD (a solid-state electronic imaging device) 4. The substrate pulses SUB and A-field vertical transfer pulses VA are applied to the CCD 4 via a V driver 5, and the B-field vertical transfer pulses are applied to the CCD 4 via a V driver 6.

The field index signal FI, X-timing signal XTM and horizontal synchronizing signal HD are applied to a CPU 3. The CPU 3 provides the CG 1 with a shutter-enable signal TSEN, which indicates that the exposure conditions have been set, and an electronic-shutter control signal TS1 that determines the timing for starting exposure in the CCD 4.

Interlaced photography is performed in the CCD 4 by virtue of the substrate pulses SUB, the A-field vertical transfer pulses VA, the B-field vertical transfer pulses VB and the horizontal transfer pulses H, video signals (color-sequential signals of GRGB) of A and B fields are produced alternately field by field, and these signals are read out in successive fashion. Drive of the CCD 4 (namely image pick-up and readout of the video signal) is performed at least at the time of photography and in photometric processing that precedes it.

The video signals of the A and B fields outputted by the CCD 4 are applied to a color separating circuit 8 through a correlated double-sampling circuit (CDS) 7. The color separating circuit 8 separates the input video signal into color signals of the three primary colors G (green), R (red) and B (blue), which represent the image of a subject.

The color signals G, R, B are subjected to a color-balance correction by a gain-controlled amplifier circuit (hereinafter referred to as a "GCA") 9, after which a tone correction is applied by a gamma-corrector circuit 10. The resulting corrected signals enter a clamping and resampling circuit 11.

The clamping and resampling circuit 11 clamps the three color signals R, G, B and converts them back into the color-sequential signals GRGB ... by resampling. The color-sequential signals enter a gain-controlled blanking circuit 12. The latter amplifies the color-sequential signals to a suitable level in order for these signals to be recorded and also applies a blanking signal to them. The output signal of the circuit 12 is then converted into digital image data by an A/D converter 13.

As will be described later in detail, photometric processing and exposure control (control of the iris and shutter speed) based upon the photometric value are performed prior to photography. The photometric processing is executed based upon the output signal of the GCA 9. Photography is performed after photometric processing, exposure control and focusing control. The video signal obtained from the CCD 4 by photography is rendered into digital image data through the above-described circuits 10, 11, 12 and 13, the digital data is subjected to such processing as Y/C separation and data compression by image-data processing circuitry (not shown), and then the resulting image data is recorded on a recording medium such as a memory card.

Figure 2:
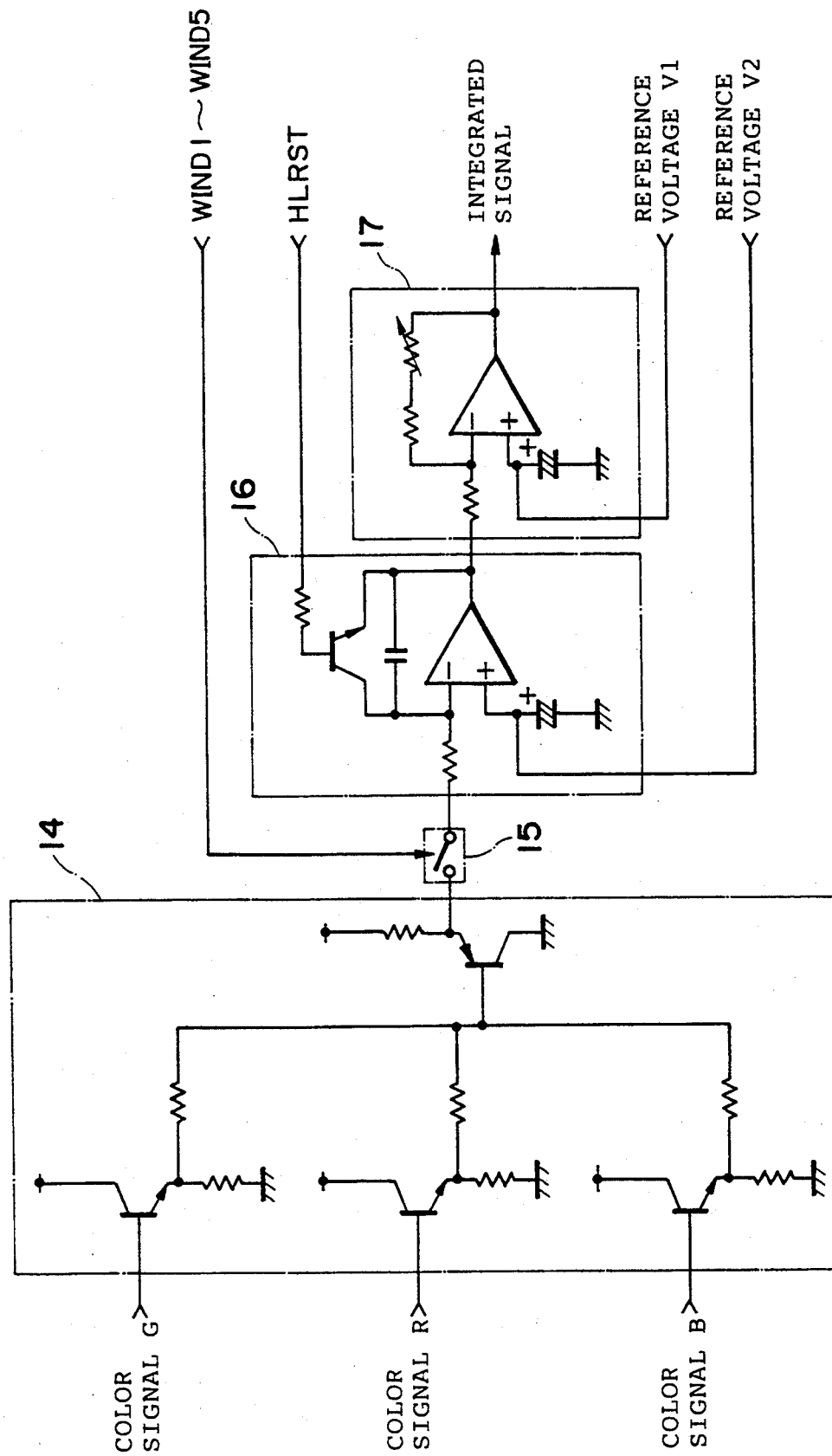
FIG. 2 is a circuit diagram illustrating a more detailed electrical configuration of circuitry necessary for photometry in the digital still-video camera of FIG. 1.

A $Y_L$ synthesizing circuit 14, a gate circuit 15, an integrating circuit 16 and an amplifier circuit 17 are provided in order to execute photometric processing. FIG. 2 illustrates an example of the specific electrical configuration of these circuits. The CPU 3 outputs window signals WIND1~WIND5 for controlling the gate circuit 15 and a reset signal HLRST for resetting the integrating circuit 16. The timing of the signals WIND1~WIND5 and HLRST will be described later. Further, in this embodiment, the CPU 3 has an internal A/D converter 18.

The color signals R, G and B outputted by the GCA 9 are added by the $Y_L$ synthesizing circuit 14, which produces a relatively low-frequency luminance signal $Y_L$ (hereinafter referred to simply as a luminance signal $Y_L$). The luminance signal $Y_L$ passes through the gate circuit 15 for a length of time during which any of the window signals WIND1~WIND5 is applied in the prescribed horizontal scanning interval. The integrating circuit 16 is reset when the reset signal HLRST is applied, after which it integrates the luminance signal $Y_L$ entered from the gate 15. The integrated signal from the integrating circuit 16 is amplified by the amplifier circuit 17, after which the amplified signal is converted into digital integrated data by the A/D converter 18 of the CPU 3 immediately before the integrating circuit 16 is reset. The digital integrated data is accepted by the CPU 3. Reference voltages V1, V2 of the integrating circuit 16 and amplifier circuit 17 apply appropriate offsets to these circuits.

In this embodiment, the photographic area of the CCD 4 is subdivided into 15 split photometric areas and 15 split photometric operations are performed, in which a photometric value is detected with regard to each of the split photometric areas. Further, the A-field image and B-field image constructing one frame may be considered to represent images of the field of view at substantially the same point in time. In this embodiment, therefore, photometry is performed using the video signal of the A field. Of course, photometry may be performed using the video signal of the B field, or the video signal of the B field can be utilized for another purpose, such as split photometry in another form, focusing processing, etc.

Further, in this embodiment the integration carried out by the integrating circuit 16 is performed in alternation with the A/D conversion operation by the A/D converter 18 and addition processing every horizontal scanning interval.

Figure 3:
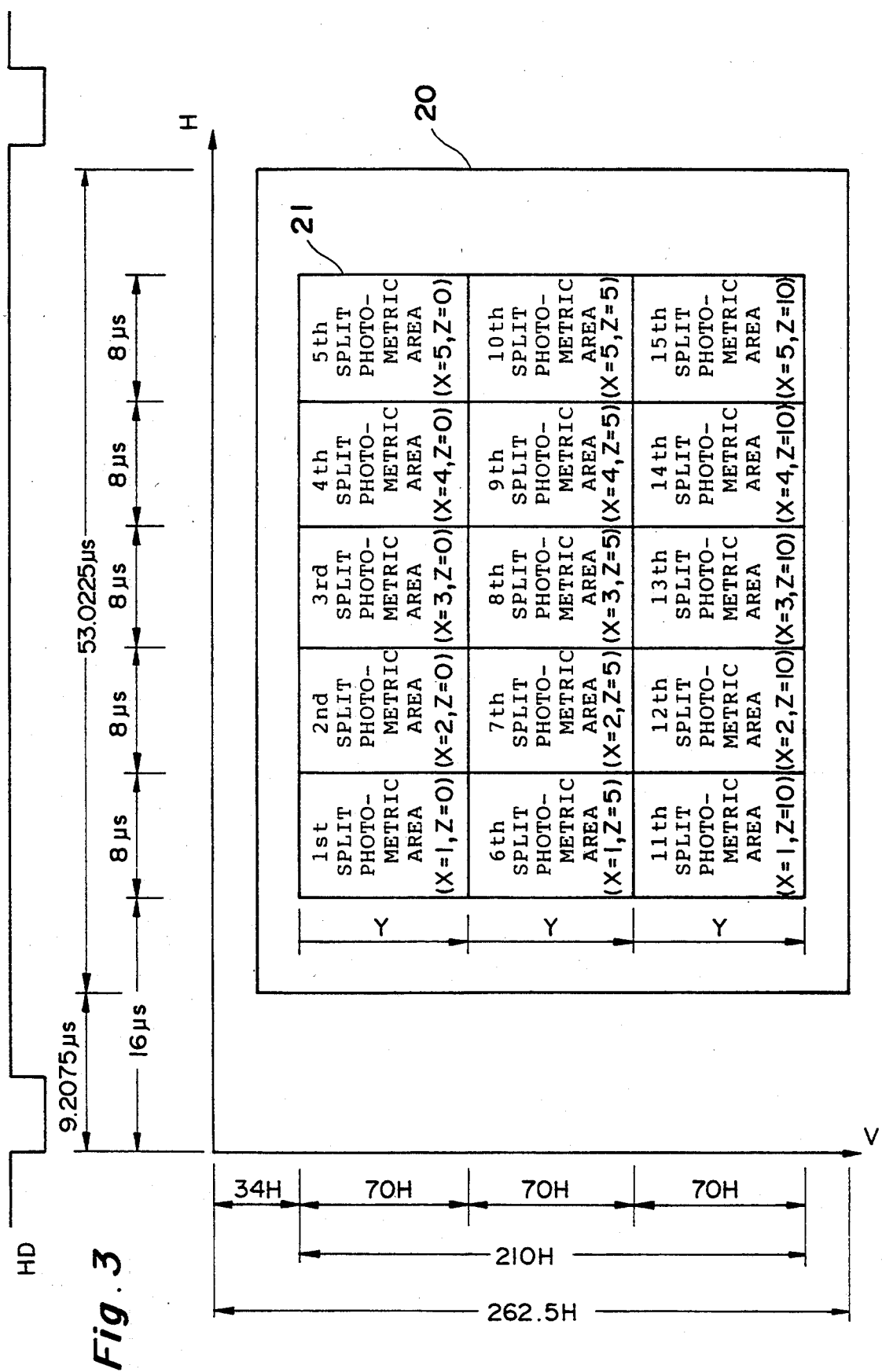
FIG. 3 is a diagram illustrating split photometric areas set within a photographic area.

FIG. 3 is a diagram illustrating 15 split photometric areas set within a photographic area 20 of the CCD 4.

The 15 split photometric areas are set by demarcating the scanning interval in the horizontal scanning direction of the photometric area 21 established across substantially the entirety of the photographic area 20 into five intervals and demarcating the scanning interval in the vertical scanning direction of the photometric area 21 into three intervals (thereby forming split photometric areas in an array of three rows and five columns).

More specifically, each split photometric area is set in the horizontal direction every 8 μs, which is the result of dividing an interval of 40 μs equally by five, following elapse of 16 μs from the leading edge of the horizontal synchronizing signal HD (i.e., from the moment at which the horizontal scanning interval begins), and each split photometric area is set in the vertical direction every 70 horizontal scanning intervals, which is the result of dividing the horizontal scanning lines from the 35th to the 244th scanning lines equally by three.

In the 3×5 array of split photometric areas, the split photometric areas of the first row, second row and third row shall be referred to respectively as first through fifth, sixth through tenth and 11th through 15th split photometric areas starting from the left side.

Figure 4:
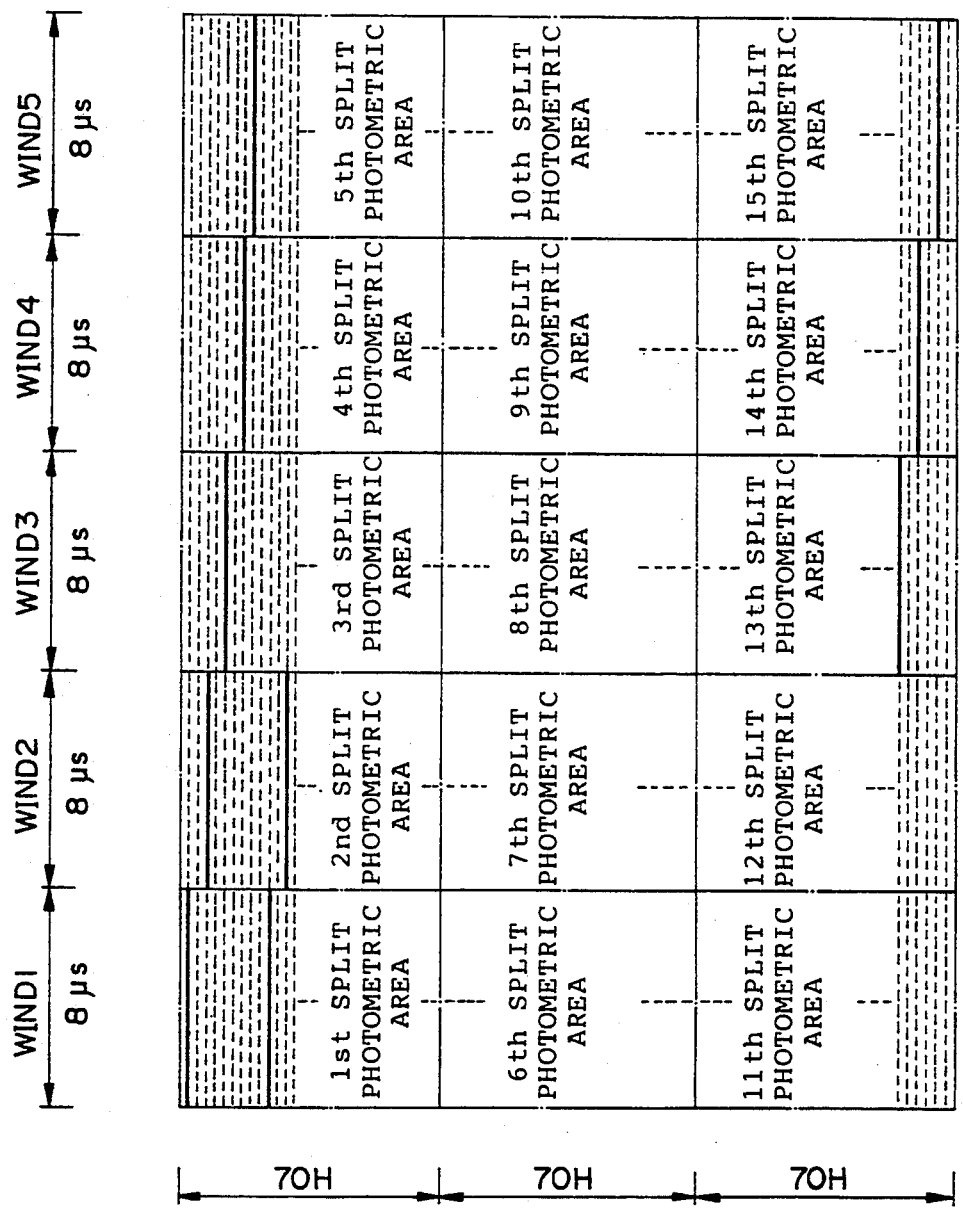
FIG. 4 is a diagram illustrating a method of scanning in each split photometric area.

FIG. 4 is a diagram illustrating the integration times of the integrating circuit with regard to respective ones of the 15 split photometric areas, as well as the window signals WIND1~WIND5 for controlling the gate circuit 15. The portions indicated by the solid lines in the horizontal scanning lines are the integration times, which are stipulated by the corresponding window signals (any one of the signals WIND1~WIND5). One window signal (any one of the signals WIND1~WIND5) per horizontal scanning line is generated in the following order: window signal WIND1, WIND2, ..., WIND5. The generation of the window signals takes place within the photometric area 21 (namely from the 35th horizontal scanning line to the 243rd horizontal scanning line). Further, in order to assure enough A/D conversion time for the A/D converter 18, a window signal is generated every other horizontal scanning line, as set forth earlier. Accordingly, integration is performed seven times in each split photometric area.

The integration times, in the horizontal direction, of the first, sixth and 11th split photometric areas belonging to the first column are stipulated by the first window signal WIND1. Similarly, the integration times, in the horizontal direction, of the second, seventh and 12th split photometric areas belonging to the second column, of the third, eighth and 13th split photometric areas belonging to the third column, of the fourth, ninth and 14th split photometric areas belonging to the fourth column and of the fifth, tenth and 15th split photometric areas belonging to the fifth column are stipulated by the second window signal WIND2, third window signal WIND3, fourth window signal WIND4 and fifth window signal WIND5, respectively.

During the period of time that any one of the first through fifth window signals WIND1~WIND5 is being applied, the gate circuit 15 passes the entering luminance signal $Y_L$ so that the luminance signal $Y_L$ enters the integrating circuit 16.

The integrating circuit 16 is already reset in each preceding horizontal scanning interval and therefore integrates the entering luminance signal $Y_L$ passed by the gate circuit 15. When the window signals WIND1~WIND5 assume the L level so that entry of the luminance signal $Y_L$ to the integrating circuit 16 halts, the integrated output of the integrating circuit 16 is held as is and this output is converted into digital data by the A/D converter 18 incorporated in the CPU 3. The integrating circuit 16 is thereafter reset by the horizontal-line resetting signal HLRST, which is provided by the CPU 3, to prepare for the next integration operation.

A memory (e.g., a RAM) peripheral to the CPU 3 is provided with first through 15th storage areas for storing integrated data representing split photometry as shown in FIG. 6. These integrated-data storage areas are cleared in synchronism with the 34th horizontal synchronizing signal HD or at the beginning of the A field. The integrated value converted into digital data by the A/D converter 18 is added to the previous data (which will be zero in the case of the first operation owing to clearing) and the sum is stored in the integrated-data storage area with regard to which this integrated value was obtained.

The A/D conversion performed by the A/D converter 18, the resetting of the integrating circuit 16 and the processing for adding the integrated data are performed in the horizontal scanning interval that follows the horizontal scanning interval in which integration was carried out.

Figure 5:
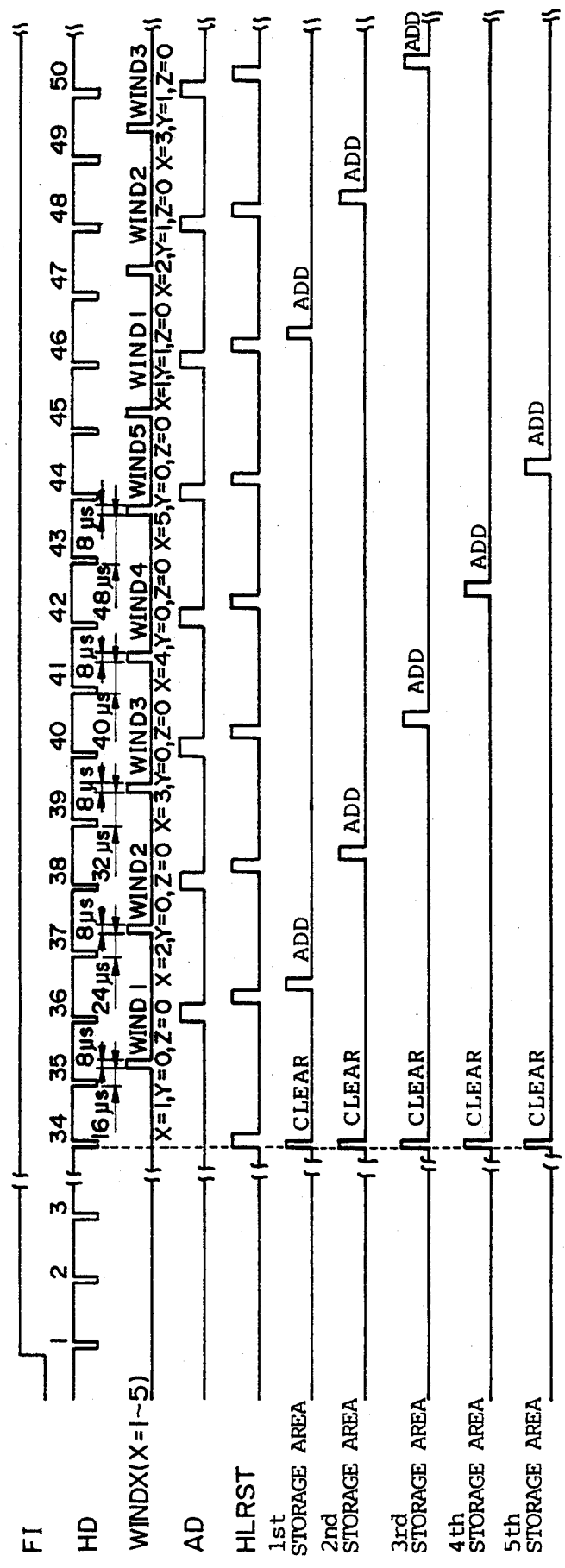
FIG. 5 is a time chart of split photometry.

As shown in FIG. 5, the integration of the luminance signal $Y_L$ by the integrating circuit 16 along one horizontal scanning line in each split photometric area is performed in alternation with the A/D conversion of the integrated signal, the resetting of the integrating circuit 16 and the addition of the integrated data in memory in the horizontal scanning interval that follows the integration operation. Specifically, the integration on the one hand and the A/D conversion, resetting and addition on the other are performed repeatedly in alternating fashion seven times for each split photometric area.

Thus, integration of the luminance signal YL is performed every other horizontal scanning line, and the A/D conversion and other processing is carried out in the horizontal scanning interval that follows the horizontal scanning interval in which integration was performed. As a result, these operations can be dealt with even using a low-speed A/D converter. Even though integration is performed every other horizontal scanning line, integration along seven horizontal scanning lines is possible in each split photometric area. This makes it possible to acquire integrated data in a quantity sufficient to obtain photometric values.

Figure 7:
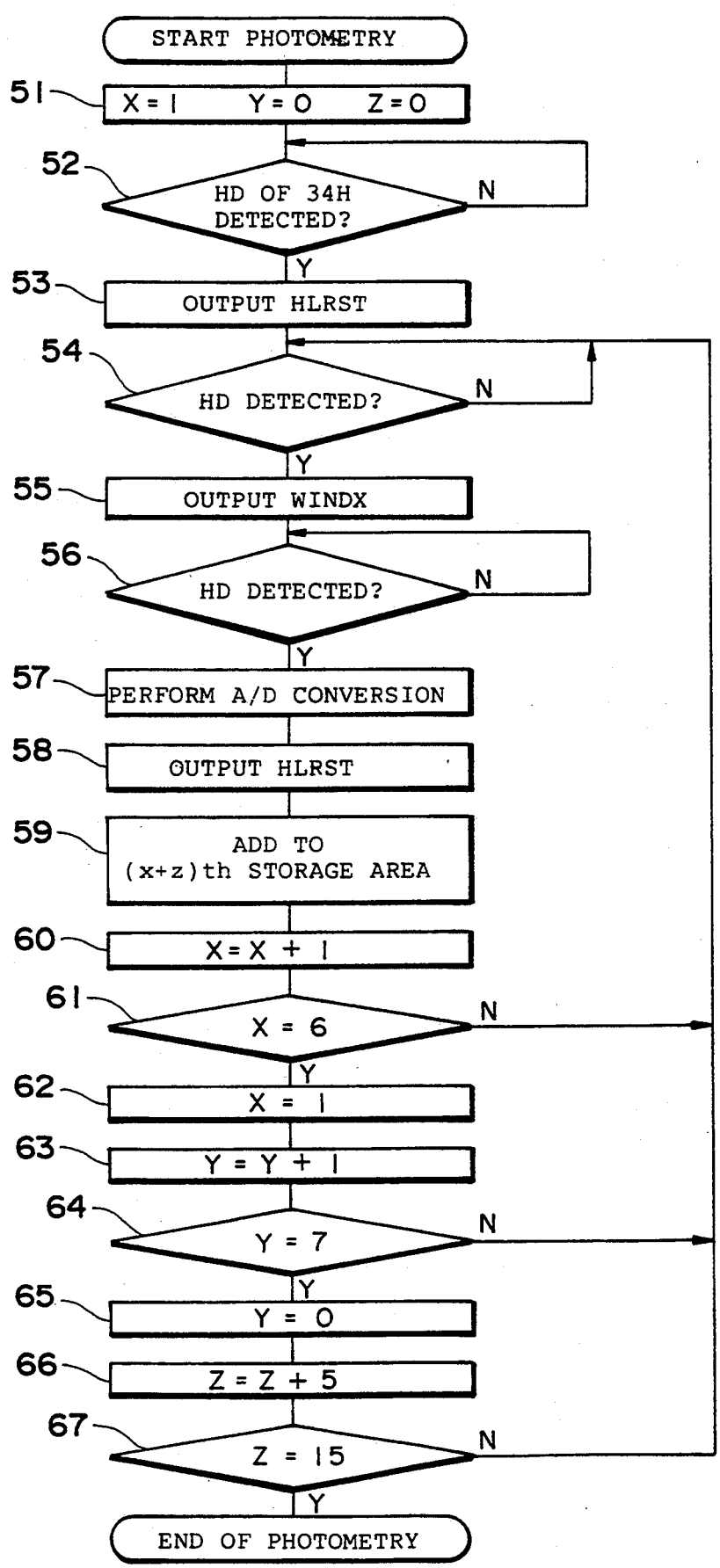
FIG. 7 is a flowchart illustrating a procedure for split photometric processing executed by a CPU.

FIG. 7 is a flowchart illustrating the overall operation of split photometric processing executed by the CPU 3.

At the start of photometric processing, the CPU 3 performs initial setting of the exposure conditions and controls one or both of the iris and electronic shutter so that the initial exposure conditions will be realized. An example of an initial exposure condition that is preferred is one that is most likely statistically, e.g., an exposure quantity of EV=10 (an f-stop of F4 and a shutter speed of 1/60 sec or an f-stop of F2 and a shutter speed of 1/125 sec). Of course, preliminary photometry may be performed using a photometric element and the initial setting of exposure conditions may be carried out based upon the results of preliminary photometry.

Three types of counters X, Y and Z are used in order to perform integration, A/D conversion and addition seven times each with regard to the 15 split photometric areas. The counter X represents the column number of the split photometric areas; the column number coincides with the number of the window signals WIND1~WIND4. The counter Y indicates the number of times one series of processing operations performed in each split photometric area ends, this series of operations being the aforementioned integration, A/D conversion and addition of integrated data. The counter Z represents the row number of the split photometric areas; Z=0 is set for the first row, Z=5 for the second row and Z=10 for the third row. The value of X+Z coincides with the number of a split photometric area (and the number of a storage area in the memory that stores the integrated data of split photometry). For example, with regard to the eighth split photometric area, X=3, Z=5 hold and X+Z=8. Refer to FIGS. 3 and 5.

In initialization processing, these counters are set at X=1, Y=0 and Z=0 (step 51).

When the 34th horizontal synchronizing signal HD is detected (step 52), the horizontal-line reset signal HLRST is outputted (step 53), whereby the integrating circuit 16 is reset.

When the next horizontal synchronizing signal HD is detected (when, after detection of the 34th horizontal synchronizing signal, the next horizontal synchronizing signal is detected the first time, this signal is the 35th horizontal synchronizing signal and serves as a criterion for judging whether the photometric area has been penetrated) (step 54), and a window signal WINDX, the number of which conforms to the value in the counter X, is applied to the gate circuit 15 (step 55), integration of the luminance signal $Y_L$ by the integrating circuit 16 is performed.

When the next horizontal synchronizing signal HD is detected (step 56), the integrated output of the integrating circuit 16 is converted into digital data by the A/D converter 18 (step 57), after which the horizontal-line reset signal HLRST is outputted to reset the integrating circuit 16 (step 58).

The digital integrated data converted into digital data by the A/D converter 18 is added to the previous data (zero when Y=0 holds since there is no previous integrated data in such case) stored in the (X+Z)th integrated-data storage area of the memory and the sum is stored therein in place of the previous data (step 59).

The counter X is thenceforth incremented (step 60) and it is determined whether X=6 has been attained (step 61). If the value in the counter X is not 6, the program returns to step 54 in order to perform photometric processing regarding the next split photometric area belonging to the same row.

With regard to a split photometric area designated by the value (Z=0 at this time) in the incremented counter X, integration of the luminance signal $Y_L$ by the integrating circuit 16, A/D conversion of the integrated value by the A/D converter 18, resetting of the integrating circuit 16 and processing for adding the integrated data to the corresponding integrated-data storage area are repeated in similar fashion, while the counter X is incremented, until X=6 is attained (steps 54~60).

When the first photometric processing operation in each of the first through fifth split photometric areas belonging to the first row ends and X=6 is attained (step 61), the counter X is initialized again (X=1) (step 62) and the counter Y is incremented (step 63). When the value in counter Y becomes equal to 7, this means that seven horizontal lines of photometric processing regarding split photometric areas belonging to the first row have ended. Accordingly, whether or not Y=7 holds is checked (step 64). If Y=7 has not yet been attained, the program returns to step 54 and the processing from steps 54 to step 61 is repeated.

When the photometric processing in the first through fifth split photometric areas belonging to the first row ends (Y=7) (step 64), the counter Y is initialized (step 65) and 5 is added to the counter Z (Z =5) (step 66) in order that photometric processing regarding the sixth through tenth split photometric areas belonging to the second row may be executed. The program subsequently returns to step 54 and steps 54~64 are repeated, whereby photometric processing regarding the sixth through tenth split photometric areas belonging to the second row is executed.

When photometric processing regarding the split photometric areas of the second row ends (YES at step 64), the counter Y is initialized again and 5 is added to the counter Z (Z=10). Photometric processing regarding the 11th through 15th split photometric areas belonging to the third row is then executed in the same manner. When Z=15 is eventually attained, this means that photometric processing regarding all of the split photometric areas is concluded.

When a summed value of integrated data in each of the 15 split photometric areas is thus obtained, a photometric value for every split photometric area is calculated as necessary based upon the summed value. The summed value itself may be used as the photometric value or the summed value may be subjected to a suitable operation (e.g., multiplication by a predetermined coefficient) to thereby obtain the photometric value. It is not always necessary to obtain a photometric value for each and every one of the 15 split photometric areas; only photometric values necessary for exposure control need be obtained. As will be described later, an average photometric value regarding a plurality of split photometric areas may be calculated.

The setting of exposure conditions may be performed as set forth below, for example, based upon the split photometric values (denoted by EV1~EV15), found in the manner described above, of the first through 15th split photometric areas.

Figure 8:
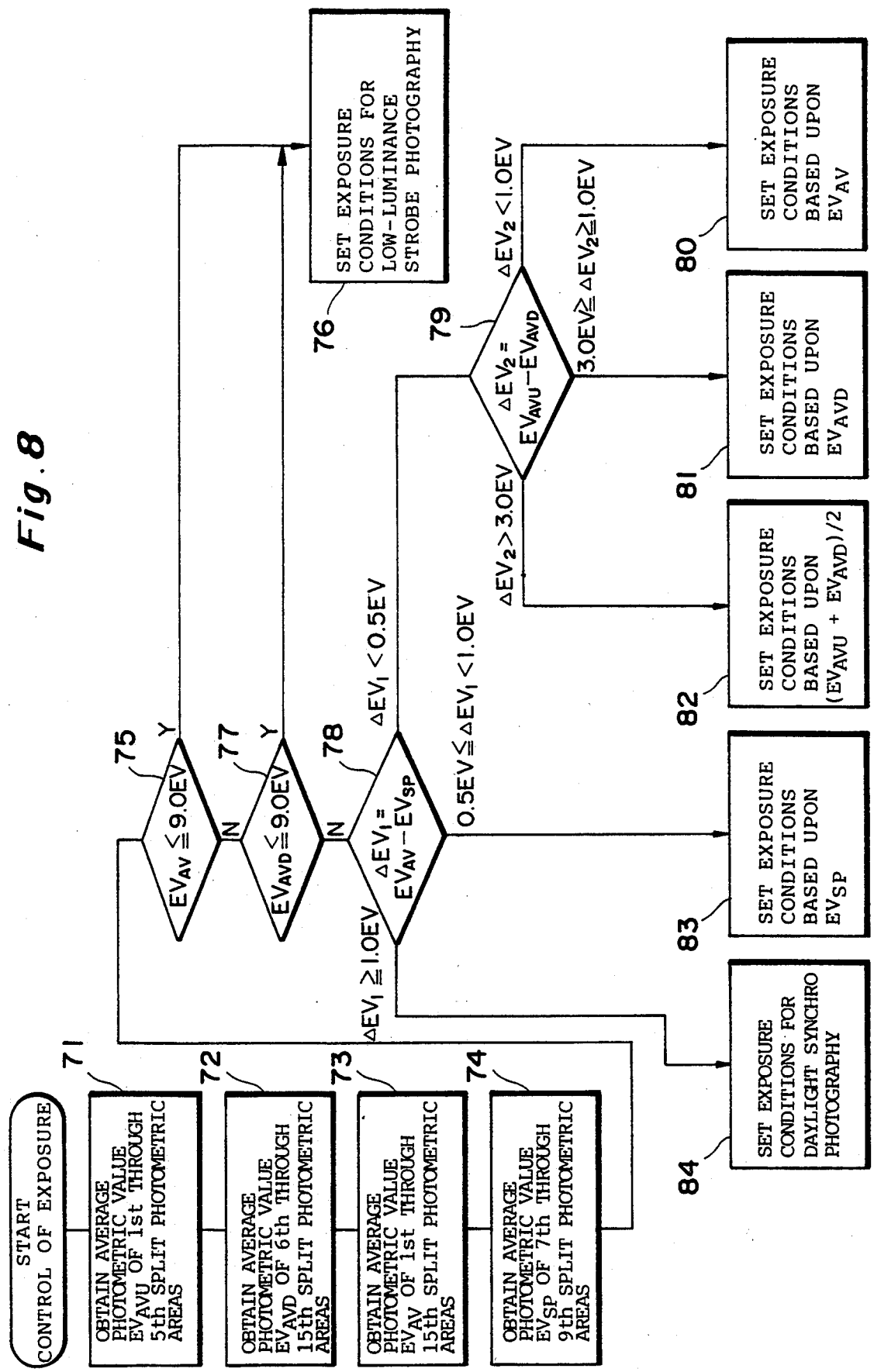
FIG. 8 is a flowchart illustrating a procedure executed by a CPU for setting exposure conditions based upon split photometric values.

FIG. 8 is a flowchart illustrating the procedure of processing executed by the CPU 3 for the purpose of setting exposure conditions.

The CPU 3 obtains an average photometric value (hereinafter referred to as an "upper average photometric value") $EV_{AVU}$ of the split photometric values EV1-~EV5 from the first split photometric area to the fifth split photometric area (hereinafter referred to as "upper photometric areas") (step 71).

Next, the CPU 3 obtains an average photometric value (hereinafter referred to as a "lower average photometric value") $EV_{AVD}$ of the split photometric values EV6~EV15 from the sixth split photometric area to the 15th split photometric area (hereinafter referred to as "lower photometric areas") (step 72).

The CPU 3 then obtains an average photometric value of the split photometric values EV1~EV15 from the first split photometric area to the 15th split photometric area (hereinafter referred to as "average photometric areas"), namely an average photometric value (hereinafter referred to as an "average photometric value") $EV_{AV}$ of the entire photometric area 21 (see FIG. 3) (step 73).

Next, the CPU 3 obtains an average photometric value (hereinafter referred to as a "spot photometric value") $EV_{SP}$ of the split photometric values EV7-~EV9 from the seventh split photometric area to the ninth split photometric area (hereinafter referred to as "spot photometric areas") (step 74).

It is determined whether the average photometric value $EV_{AV}$ is equal to or less than 9.0 EV (step 75). If $EV_{AV} \leq 9.0$ EV is found to hold, namely if the luminance of the subject in the average photometric areas is judged to be small, this means that it is necessary to brighten the subject. Accordingly, preparations are made for firing a strobe for the purpose of photography by a low-luminance strobe emission, and the exposure conditions which will prevail at the strobe emission are set (step 76).

If it is found at step 75 that $EV_{AV} \leq 9.0$ EV does not hold, i.e., if the luminance of the subject in the average photometric areas is judged to be large, then it is determined whether the lower average photometric value $EV_{AVD}$ is equal to or less than 9.0 EV (step 77). If $EV_{AVD} \leq 9.0$ EV is found to hold, then the program proceeds to step 76 and, just as in the case of the determination regarding the average photometric value $EV_{AV}$, preparations are made for firing the strobe for the purpose of photography by a low-luminance strobe emission, and the exposure conditions which will prevail at the strobe emission are set.

The reason for making this judgment with regard to the lower average photometric value $EV_{AVD}$ in this manner is as follows: Consider a case in which a subject such as the sky having a high degree of luminance is present in the upper photometric areas and the main subject such as a person is present in the lower photometric areas. Even though the luminance of the main subject is small in such case, the average photometric value $EV_{AV}$ is large owing to the high-luminance subject. As a consequence, firing of the strobe will be judged to be unnecessary if the criterion is solely the average photometric value $EV_{AV}$, and the main subject will be too dark when photographed.

If it is found at step 77 that $EV_{AVD} \leq 9.0$ EV does not hold, i.e., if the luminance of the subject in the lower photometric areas is large and, hence, the overall subject is judged to be bright, then, in order to judge the difference in luminance between the main subject and the background, the difference $\Delta EV_1$ ($=EV_{AV}-EV_{SP}$) between the average photometric value $EV_{AV}$ and the spot photometric value $EV_{SP}$ is calculated and it is determined whether the difference $\Delta EV_1$ between the photometric values is less than 0.5 EV, greater than 0.5 EV and less than 1.0 EV, or equal to or greater than 1.0 EV (step 78).

If $\Delta EV_1 < 0.5$ EV is judged to hold at step 78, namely if the difference in luminance between the main subject and the background is determined to be small, then, in order to judge the difference in luminance between the subject in the upper photometric areas and the subject in the lower photometric areas, the difference $\Delta EV_2$ ($=EV_{AVU}-EV_{AVD}$) between the upper average photometric value $EV_{AVU}$ and the lower average photometric value $EV_{AVD}$ is calculated and it is determined whether the difference $\Delta EV_2$ between the photometric values is less than 1.0 EV, equal to or greater than or equal to 1.0 EV and less than 3.0 EV, or greater than 3.0 EV (step 79).

If it is found at step 79 that $\Delta EV_2 < 1.0$ EV holds, i.e., if the difference in luminance between the subject in the upper photometric areas and the subject in the lower photometric areas is small and, hence, a portion exhibiting a large difference in luminance does not exist across the entirety of the subject, then the setting of exposure conditions is performed based upon the average photometric value $EV_{AV}$ (step 80).

If it is found at step 79 that $3.0$ EV $\geq \Delta AEV_2 \geq 1.0$ EV holds, i.e., if it is judged that the subject in the upper photometric areas is bright in comparison with the subject in the lower photometric areas, then the setting of exposure condition is performed based upon the lower average photometric value $EV_{AVD}$ (step 81). The reasons for this are as follows; If the setting of exposure condition is performed based upon the average photometric value $EV_{AV}$, the subject including the main subject in the lower photometric areas will be dark when photographed. It is believed best to allow suitable exposure of the main subject which is considered to be what the photographer desires to photograph most.

If it is found at step 79 that $\Delta EV_2 > 3.0$ EV holds, i.e., if it is judged that the subject in the upper photometric areas is bright in comparison with the subject in the lower photometric areas and, moreover, that the difference in luminance between the two is very large, then the setting of exposure conditions is performed based upon the average value ($EV_{AVU}+EV_{AVD}$)/2 of the upper average photometric value $EV_{AVU}$ and the lower average photometric value $EV_{AVD}$ (step 82). In other words, in this case an exposure correction (backlighting correction) is carried out so as to darken the subject in the upper photometric areas and brighten the subject in the lower photometric areas.

If it is found at step 78 that $0.5$ EV $\leq \Delta EV_1 < 1.0$ EV holds, i.e., if it is judged that the main subject is darker than the background, then the exposure conditions are set based upon the spot photometric value $EV_{SP}$ (step 83). The reason for this is that it is believed best to allow suitable exposure of the main subject, which is considered to be what the photographer desires to photograph most, even while sacrificing the background to some degree.

If it is found at step 78 that $\Delta EV_1 \geq 1.0$ EV holds, i.e., if it is judged that the main subject is darker than the background and, moreover, the difference in luminance between the two is very large, then it is necessary to fire the strobe in order to brighten the subject. Accordingly, preparations are made for firing the strobe for the purpose of daylight synchronized photography, and the exposure conditions which will prevail at firing of the strobe are set (step 84).

In the embodiment described above, split photometric areas are set in an array of three rows and five columns. However, it goes without saying that the split photometric areas can be set in any desired array conforming to the purpose of photography. For example, the split photometric areas for obtaining a spot photometric value may be set so as to be larger than the other split photometric areas. It is also possible to utilize the video signal of the B field in order to obtain an average photometric value. Exposure control may employ the split photometric areas or the average photometric value of a plurality of split photometric areas, as shown in FIG. 8.

Second Embodiment

A second embodiment in which second through sixth aspects of the present invention are applied to digital still-video camera will now be described in detail with reference to the drawings.

Figure 9:
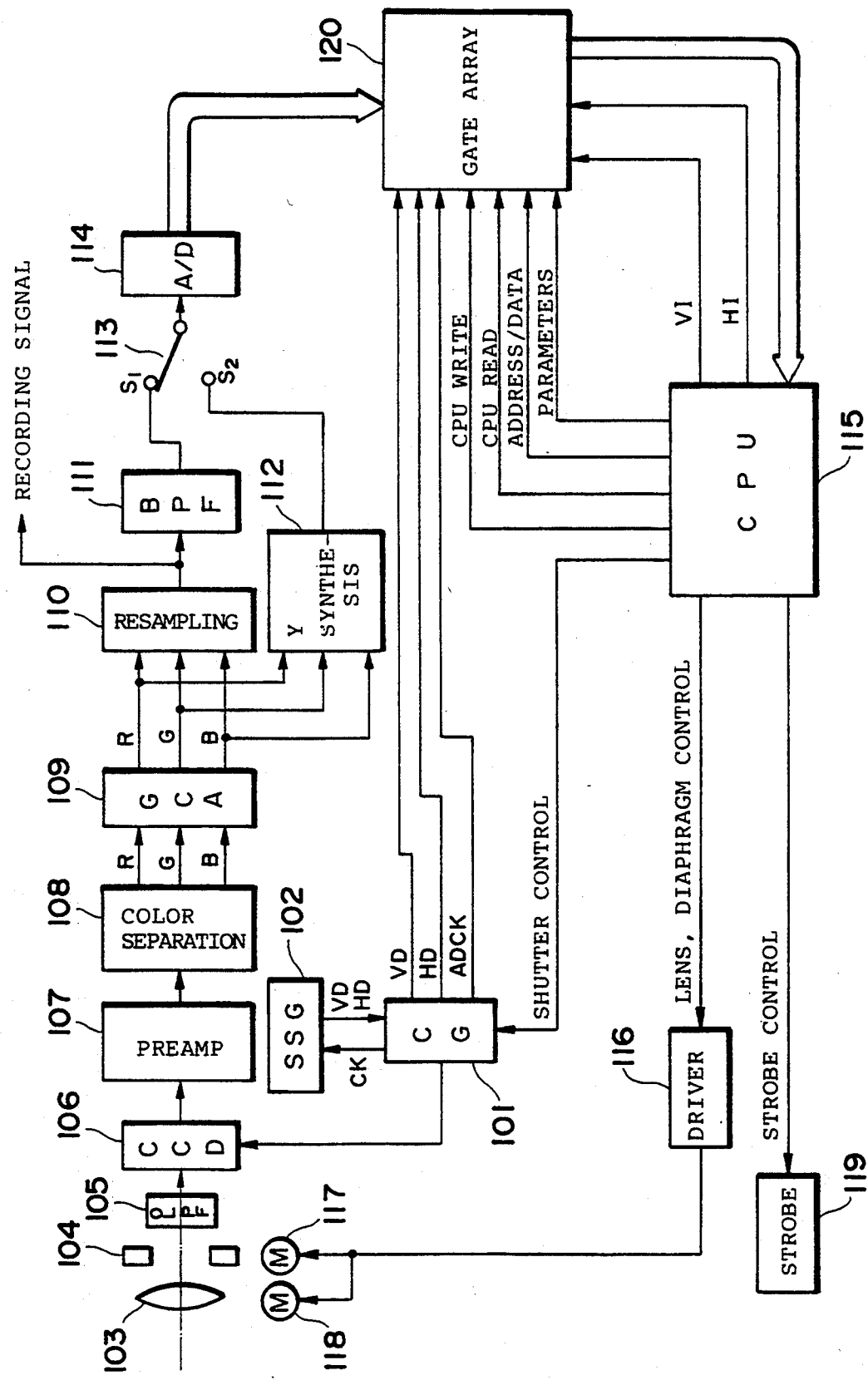
FIG. 9 is a block diagram illustrating the electrical configuration of a digital electronic still-video camera.

FIG. 9 is a block diagram illustrating the electrical configuration of a digital still-video camera according to an embodiment of the present invention.

A clock-signal generating circuit (hereinafter referred to as a "CG") 101 generates a clock signal CK, horizontal transfer pulses for driving a horizontal transfer line of a CCD 106, substrate pulses for sweeping out unnecessary charge, A-field vertical transfer pulses and B-field vertical transfer pulses. The substrate pulses and transfer pulses are applied to the CCD 106.

The clock signal CK is applied to a synchronizing signal generating circuit (hereinafter referred to as an "SSG") 102, which generates a horizontal synchronizing signal HD and a vertical synchronizing signal VD based upon the clock signal CK. The signals HD and VD are applied to the CG 101.

The horizontal synchronizing signal HD and vertical synchronizing signal VD are supplied from the CG 101 to a gate array 120. A clock signal ADCK having a period corresponding to the period at which pixel data is read out is generated in the CG 101 and then applied to the gate array 120.

The image of the subject formed by an image pick-up lens 103 is formed on the CCD 106 via a diaphragm 104 and an optical low-pass filter (OLPF) 105. The image pick-up lens 103 is positioned at the focused position by a lens drive motor 118, which is driven by a driver 116 controlled by a CPU 115, and the diaphragm 104 is driven, so as to obtain an appropriate amount of exposure, by a motor 117 driven by the driver 116 under the control of the CPU 115.

Interlaced photography is performed in the CCD 106 by virtue of the substrate pulses, the A-field vertical transfer pulses, the B-field vertical transfer pulses and the horizontal transfer pulses, video signals (color-sequential signals of GRGB) of A and B fields are produced alternately field by field, and these signals are read out in successive fashion. Drive of the CCD 106 (namely image pick-up and readout of the video signal) is performed at least at the time of photography and in photometric processing that precedes it.

The video signals of the A and B fields outputted by the CCD 106 are applied to a color separating circuit 108 through a preamplifier circuit 107. The color separating circuit 108 separates the input video signal into color signals of the three primary colors G (green), R (red) and B (blue), which represent the image of the subject.

The color signals G, R, B are subjected to a color-balance correction by a gain-controlled amplifier circuit (hereinafter referred to as a "GCA") 109, after which the R, G, B signals are applied to a resampling circuit 110.

The resampling circuit 110 converts the three color signals R, G, B back into the color-sequential signals GRGB ... by resampling. These color-sequential signals are amplified to a suitable level necessary for recording, converted into digital image data and subjected to such processing as Y/C separation and data compression by an image-data processing circuit (not shown), after which the resulting data is recorded on a storage medium such as a memory card.

Processing for focusing control of the image pick-up lens 103, photometric processing and exposure control (control of the diaphragm and shutter speed) based upon the photometric value are performed prior to photography.

Processing for focusing control of the image pickup lens 103 is carried out based upon the output signal of the resampling circuit 110. A band-pass filter (BPF) 111 is provided in order that processing for focusing control of the image pick-up lens 103 may be performed. The BPF 111 is a circuit for extracting high-frequency signal components necessary for focusing processing from the entering color-sequential signals.

Since the image is sharp when the image pick-up lens 103 is at the focused position, there are many high-frequency signal components. When the image pick-up lens 103 is not at the focused position, on the other hand, the image is blurred and hence there are few high-frequency signal components. With the digital electronic still-video camera shown in FIG. 9, positioning of the image pick-up lens 103 at the focused position is performed upon taking these points into consideration. In focusing control of the image pick-up lens 103, preliminary rangefinding is performed by a preliminary rangefinding sensor (not shown) so as to position the image pick-up lens at a position in close proximity to the focused position.

The color-sequential signal outputted by the resampling circuit 110 is applied to the BPF 111, in which the high-frequency signal components for focusing control of the image pick-up lens 103 are extracted and applied to an $S_1$ terminal of a switch circuit 113. When focusing control of the image pick-up lens 103 is carried out, the switch circuit 113 renders the S1 terminal conductive so that the high-frequency signal components are applied to an analog/digital converting circuit 114 so as to be converted into digital data that is then applied to the gate array 120.

Photometric processing is executed based upon the output signal of the GCA 109. A Y-signal synthesizing circuit 112 is provided for photometric processing. The Y-signal synthesizing circuit 112 generates a luminance signal from the R, G, B signals supplied by the GCA 109 and applies the luminance signal to an S2 terminal of the switch circuit 113. When photometric processing is carried out, the switch circuit 113 renders the $S_2$ terminal conductive so that the luminance signal is applied to the analog/digital converting circuit 114 so as to be converted into digital data that is then applied to the gate array 120.

Blocks, described below, are set in the aforementioned photographic area of the CCD. The gate array 120 sums the entering high-frequency-signal data or luminance data block by block and provides the CPU 115 with the result of addition for each block.

The CPU 115 selects the necessary data from the summed data (high-frequency-component data or luminance data) of each block entering from the gate array 120 and executes focusing control of the image pick-up lens 103 or processing for calculating a photometric value and exposure control based upon the calculation of the photometric value.

The digital electronic still-video camera is capable of strobe photography and includes a strobe device 119. The latter has its light emission controlled by the CPU 115.

Figure 10:
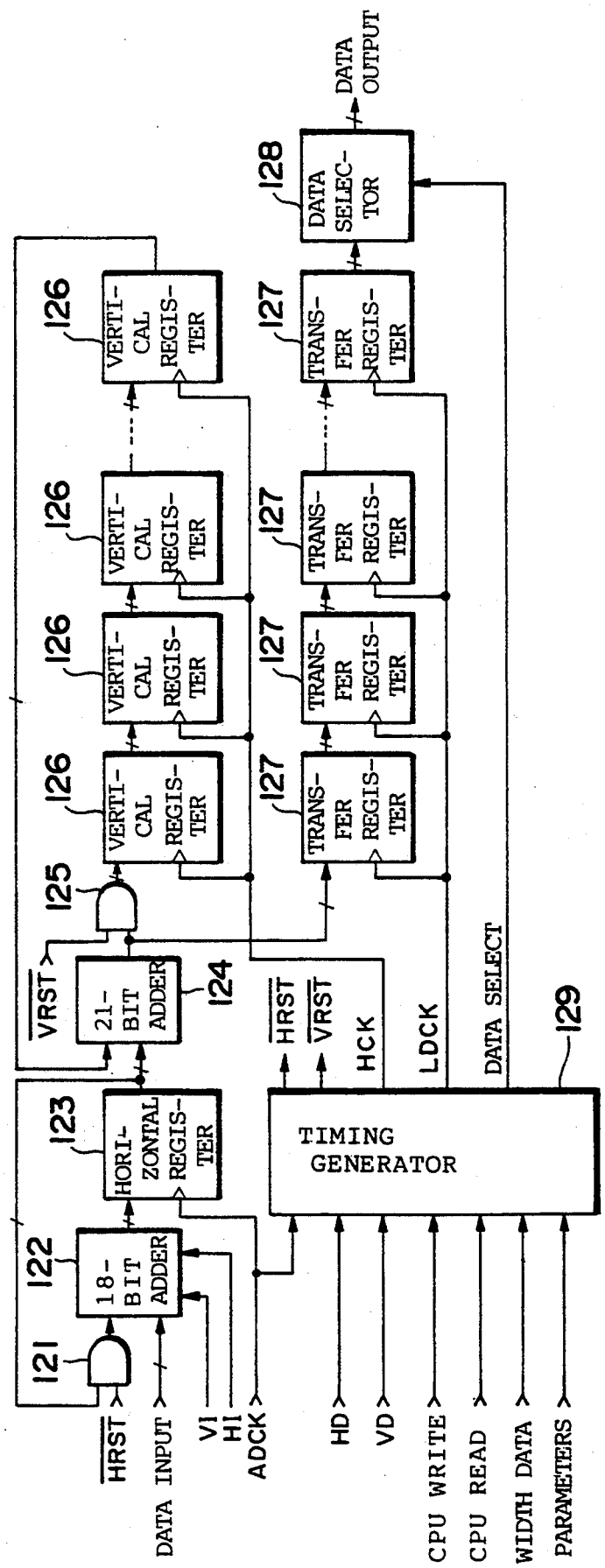
FIG. 10 is a block diagram illustrating an example of a gate array.
Figure 11:
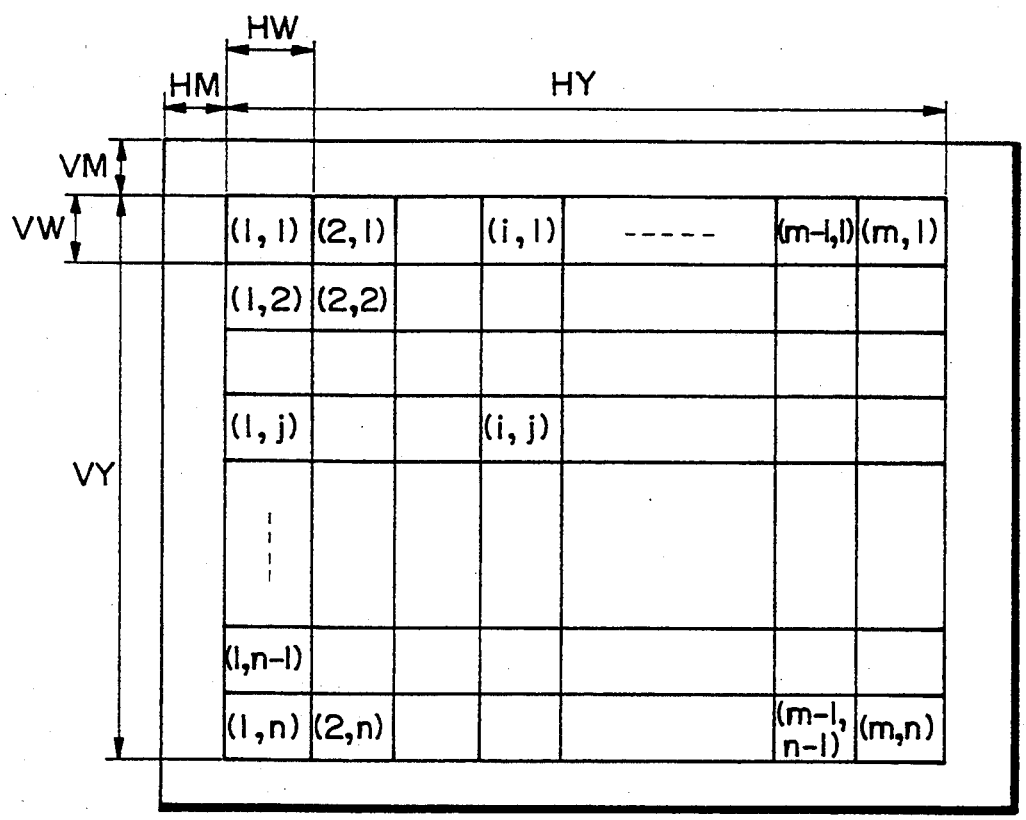
FIG. 11 illustrates a plurality of blocks set within a photographic area.
Figure 12A:
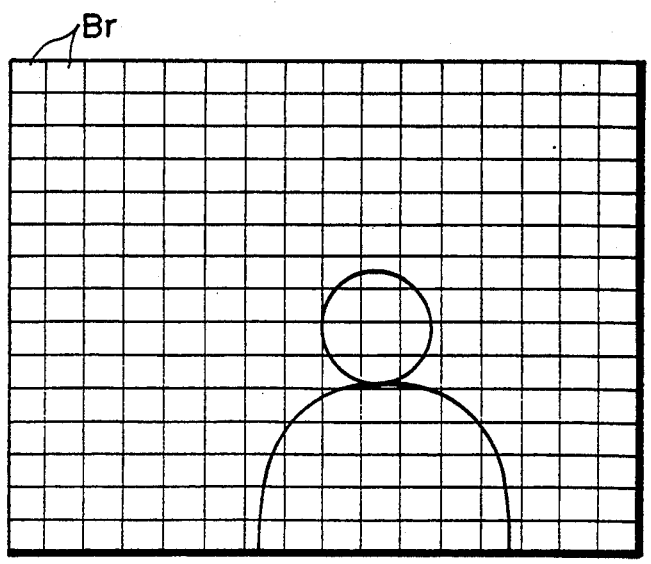
FIGS. 12a–12c illustrate the relationship between a plurality of blocks, which are set within the photographic area, and a main subject.
Figure 12B:
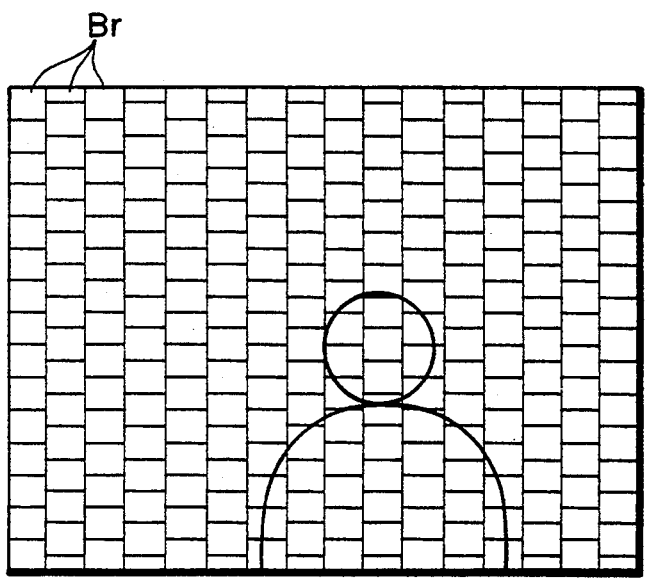
Figure 12C:
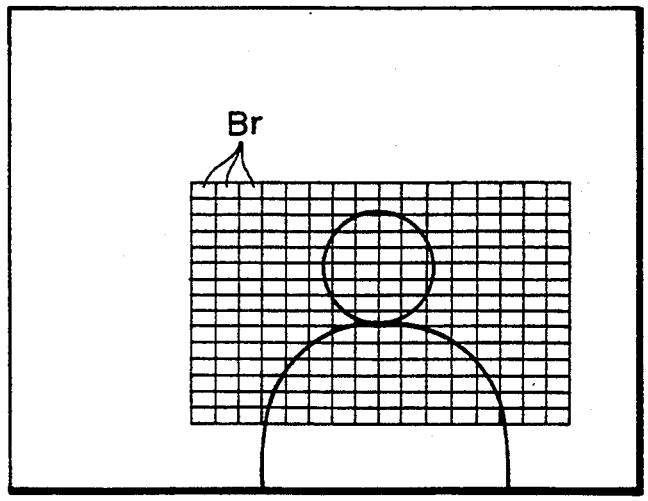

FIG. 10 is a block diagram showing the electrical configuration of the gate array, FIG. 11 illustrates the photographic area of the CCD 106 subdivided into a plurality (m×n) of blocks, and FIGS. 12a~12c illustrate the relationship between the main subject and the photographic area, which has been subdivided into 16×16 blocks, in which FIG. 12a shows one example of a method of block subdivision, FIG. 12b another example of a method of block subdivision, and FIG. 12c a method of setting blocks in a portion in which the main subject is present.

FIGS. 13a through 15 are time charts illustrating the operation of the gate array shown in FIG. 10, and FIGS. 16a1~16d are for describing the relationship between the adding operation in registers contained in the gate array and the split photometric areas of the CCD 106.

With reference mainly to FIG. 10 and FIGS. 16a~16d, it will be seen that the gate array 120 is a circuit for summing the entering pixel data of one image block by block and outputting a signal as the summed data for each block. Pixel data along one horizontal scanning line in one block Br is summed by an AND gate 121, an 18-bit adding circuit 122 and a horizontal-direction register 123. The summed data of one horizontal scanning line in one block Br is applied to a 21-bit adding circuit 124. Summed data along one horizontal scanning line in one block Br is summed in the vertical direction in one block by the 21-bit adding circuit 124, an AND gate 125 and a plurality of vertical-direction registers 126. When the summed data of the lowermost horizontal scanning line in one block Br has been applied to the 21-bit adding circuit 124, this applied summed data in the horizontal direction is added to the currently prevailing summed data in the vertical direction fed back from the vertical-direction registers 126, and the result of addition is applied, as data BD of one block Br, to a transfer register 127 that is the first stage of a plurality of transfer registers 127. A data selector 128 delivers the data as block-sum data for each and every block Br.

When, at the beginning of the horizontal addition in each block, a horizontal reset signal $\overline{HRST}$ has been applied to the AND gate 121, one input to the 18-bit adding circuit 122 becomes 0, as will be described later. As a result, the initial pixel data of a new block is stored in the horizontal-direction register 123. A vertical reset signal $\overline{VRST}$ is applied to the AND gate 125, whereby the plurality of vertical-direction registers 126 are reset.

The operation of the gate array will now be described in detail.

The vertical synchronizing signal VD, horizontal synchronizing signal HD and clock signal ADCK outputted by the CG 101 are applied to a timing generator 129 in the gate array 120. Further, the CPU 115 outputs a CPU write signal, a CPU read signal, width data representing the width of the block set in the photographic area and parameters. These signals are applied to the timing generator 129 of the gate array 120. The size and number of the blocks set in the photographic area are decided based upon these signals.

The $\overline{HRST}$ signal that decides the size of blocks in the horizontal direction, the $\overline{VRST}$ signal that decides the size of the blocks in the vertical direction, a horizontal-transfer clock HCK that decides the addition timing of the horizontal-sum data of each block, a load-clock LDCK that decides the readout timing of the summed data of each block, and a data-select signal that decides the timing of data output are generated on the basis of the signal applied to the timing generator 129.

In a case where any area contained in the photographic area is subdivided into a plurality of blocks, as shown in FIG. 11, an effective region and an ineffective region are determined within the photographic area. More specifically, an ineffective region HM and an effective region HY in the horizontal direction as well as an ineffective region VM and an effective region VY in the vertical direction are determined. Further, a block width (number of pixels) HW in the horizontal direction and a block width (number of lines) VW in the vertical direction are determined in order to determine the number of blocks. The items of determined data are supplied from the CPU 115 to the timing generator 129 of the gate array 120 as width data. These regions and widths may be determined beforehand in terms of the program of the CPU 115, they may be stored in the memory accompanying the CPU 115 in advance, or it may be so arranged that they can be entered by the user from an appropriate input unit.

Figure 13A:
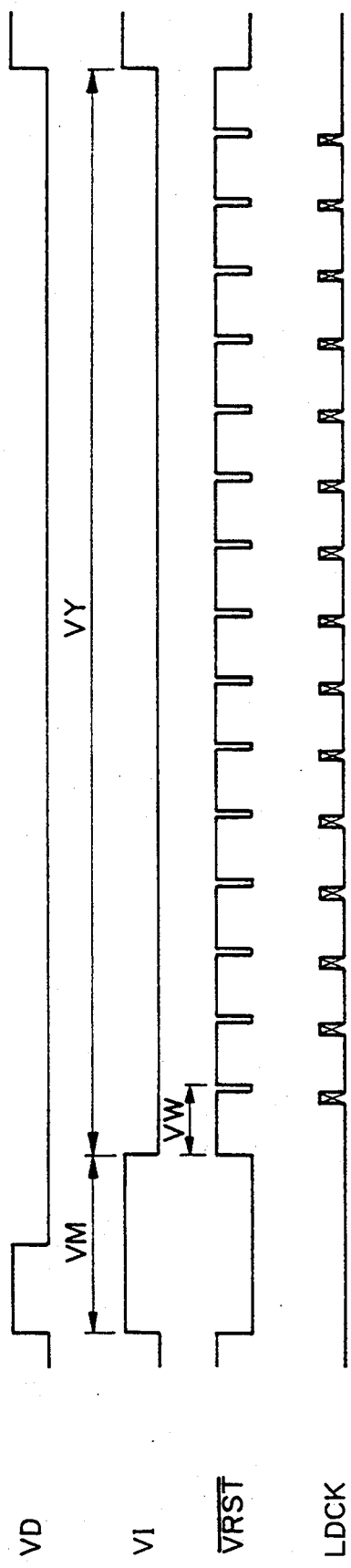
FIGS. 13a, 13b are time charts showing data accumulation and transfer in a gate array.
Figure 13B:
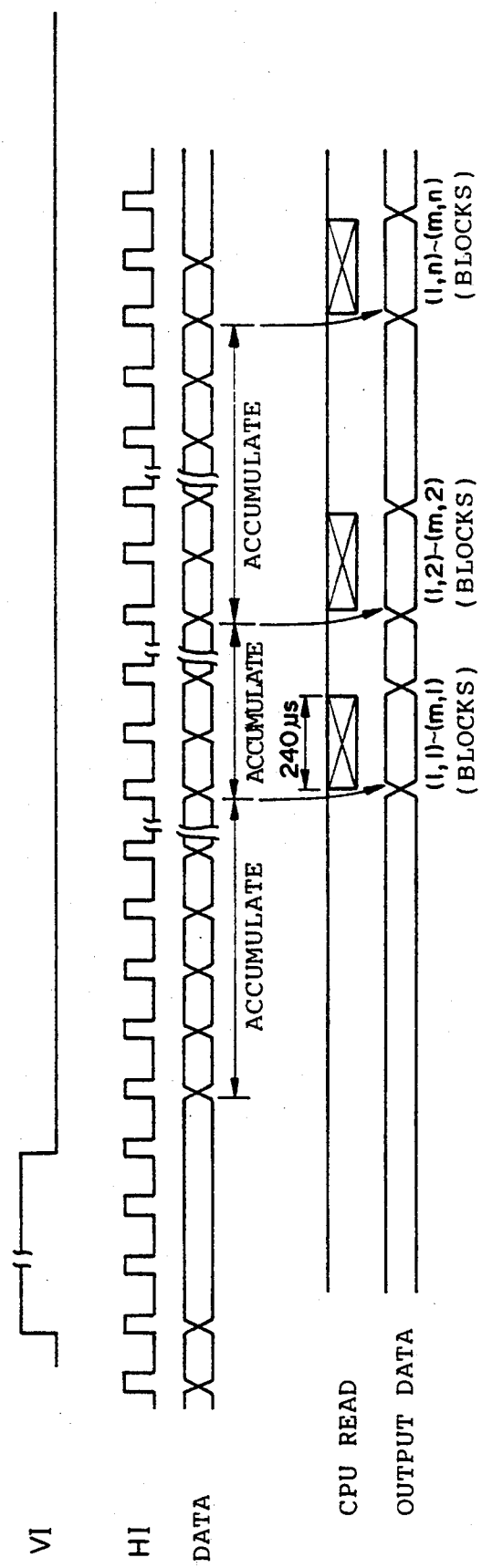

As shown mainly in FIG. 10 and FIGS. 13b, 14a, digital data (high-frequency-component data for focusing control of the image pick-up lens 103 or luminance data for photometry) enters the gate array 120 from the analog/digital converting circuit 114 pixel by pixel and is applied to the 18-bit adding circuit 122 within the gate array. The adding circuit 122 adds the entering one pixel of data to the data stored in the horizontal-direction register 123 and fed back via the AND gate 121. Whenever the clock signal ADCK for every pixel is applied thereto, the horizontal-direction register 123 accepts the summed data from the adding circuit 122 and temporarily stores the same.

The horizontal-reset signal $\overline{HRST}$, which assumes the L level at time intervals corresponding to the block width HW of the block Br in the horizontal direction thereof, is applied to the AND gate 121. When the signal $\overline{HRST}$ has been applied, the output of the AND gate 121 goes to 0, as a result of which the adding circuit 122 adds the input data and 0. Accordingly, the horizontal-direction register 123 stores the first item of pixel data of each block whenever the signal $\overline{HRST}$ enters the AND gate 121. The horizontal-sum data of one block is sent to the 21-bit adding circuit 124, which is the next stage, after the final item of pixel data of each block has been added (i.e., at the moment the signal $\overline{HRST}$ enters the AND gate 121).

A horizontal adding-control signal HI and a vertical adding-control signal VI, which are for stipulating the ineffective region HM in the horizontal direction and the ineffective region VM in the vertical direction in order to determine the adding limits, are supplied to the 18-bit adding circuit 122 by the CPU 115. The adding circuit 122 adds its input data only during the time that the signals HI and VI are at the L level.

Since the data 0 is applied to the first vertical-direction register 126 when the vertical synchronizing signal $\overline{VRST}$ is being applied to the AND gate 125, the register 126 is reset. Since the data 0 is shifted sequentially, the vertical-direction registers 126 of the respective stages are reset in sequential fashion.

The summed data of one horizontal scanning line in one block Br, which data has entered the 21-bit adding circuit 124, is applied to the vertical-direction 21-bit register 126 of the first stage via the AND gate 125 to one terminal of which the vertical synchronizing signal $\overline{VRST}$ is applied. The number of vertical-direction registers 126 provided is equivalent to the number m of blocks in the horizontal direction. The horizontal clock signal HCK, which is synchronized to the horizontal-reset signal $\overline{HRST}$, enters the clock input terminal of each of the registers 126. Accordingly, when summed data $a_{1,1}$ of one horizontal scanning line in the first block Br enters the vertical-direction register 126 of the first stage, as shown in FIG. 16a, this data is subsequently shifted sequentially in synchronization with the horizontal clock signal HCK, the horizontal-sum data $a_{1,1}$ in the first block Br is shifted to the vertical-direction register 126 of the second stage and horizontal-sum data $a_{2,1}$ in the second block Br enters the vertical-direction register 126 of the first stage. Thenceforth, and in a similar manner, the sequential shift operation and the operation for entering the horizontal-sum data of the next block Br in the vertical-direction register 126 of the first stage are repeated. The horizontal-sum data of all blocks in the effective region is stored in all of the vertical-direction registers 126. In other words, horizontal-sum data $a_{m,1}$ of the block Br in the right-hand corner is stored in the vertical-direction register 126 of the first stage, as shown in FIG. 16*b,* horizontal-sum data $a_{m-1,1}$ of the second block Br from the right-hand corner is stored in the vertical-direction register 126 of the second stage, and horizontal-sum data $a_{1,1}$ of the block Br in the left-hand corner is stored in the m-th vertical-direction register 126, which is that of the last stage.

Figure 16C:
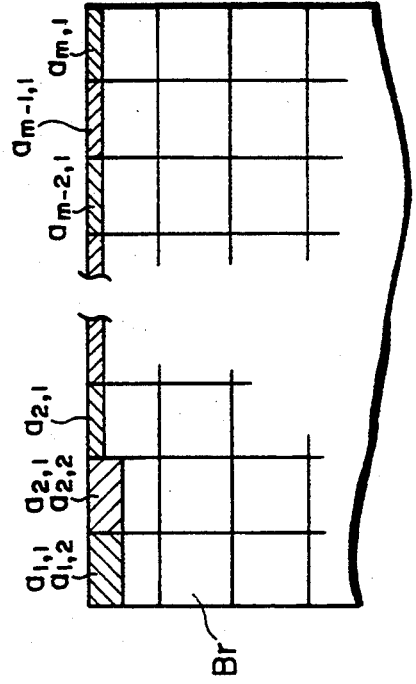
FIGS. 16a–16d illustrate the manner in which data is accumulated block by block.

When the horizontal-sum data of all blocks enters the vertical-direction registers 126, the horizontal-sum data $a_{1,2}$ of the second line in the vertical direction of the block Br in the left-hand corner enters the 21-bit adding circuit 124, as shown in FIG. 16*c.* Further, the horizontal-sum data $a_{1,1}$ in the block Br in the left-hand corner, that has been stored in the vertical-direction register 126 constituting the last stage is fed into the 21-bit adding circuit 124. Thus, the items of horizontal-sum data $a_{1,1}$ and $a_{1,2}$ are added in the 21-bit adding circuit 124. The results of this addition are applied to the register 126 of the first stage through the AND gate 125. While the data in the registers 126 is being shifted, addition in each block in the vertical direction thereof is carried out and the results of this addition are stored in the registers 126.

Figure 16D:
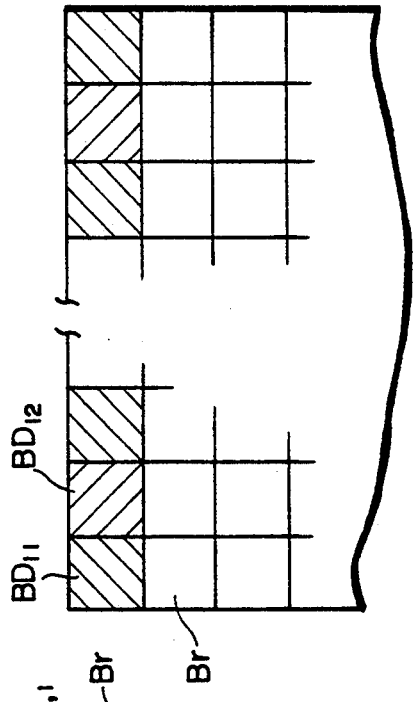
Figure 16A:
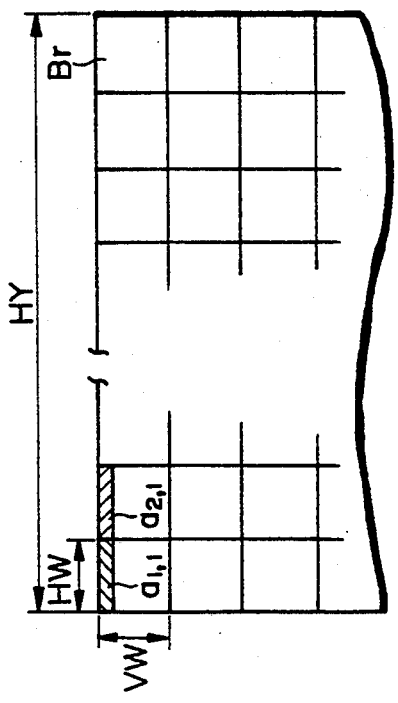
Figure 16B:
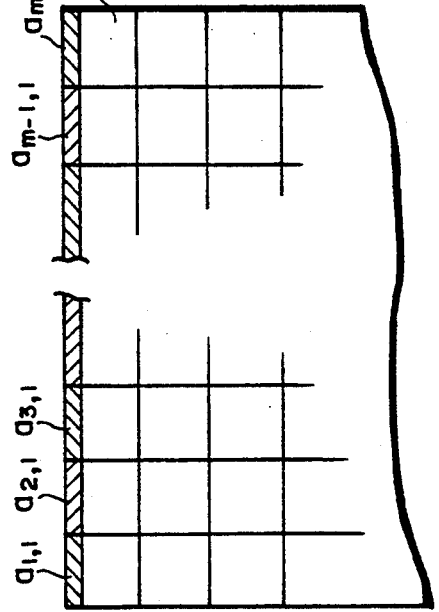

When the summed data along the last horizontal line in each block is applied to the 21-bit adding circuit 24 from the horizontal-direction register 123 and the accumulated data of the corresponding block fed back from the 21-bit register 126 of the last stage is applied to the 21-bit adding circuit 124, these items of data are added together and accumulated data BD of one block Br is obtained (see FIG. 16*d*). The accumulated data BD of one block Br is applied to the transfer register 127.

The number of transfer registers 127 provided is equal to the number m of blocks in the horizontal direction. The load-clock signal LDCK of a group that appears at a period corresponding to the width VW of each block Br in the vertical direction is applied to the clock input terminal of the 21-bit transfer register 127. The period of the signal LDCK in the group of signals corresponds to the width HW in the horizontal direction.

When the data BD of one block Br enters the 21-bit transfer register 127, the data is shifted sequentially in response to the load-clock signal LDCK and applied to the data selector 128. The data-select signal from the timing generator 129 is applied to the data selector 128. In case of 21-bit data, for example, the data selector 128 sequentially outputs the five higher order bits, the eight bits of intermediate order and the eight lower order bits. These bits are applied to the CPU 115.

The luminance data or data for focusing control is applied to the CPU 115 in the effective region that has been set. The data can be identified in block units, split photometry, average photometry or focusing control of the image pick-up lens 103 is possible using solely the appropriate data, and the processing precision of each of these operations is improved.

In the description given above, one block of data is applied to the transfer registers 127 sequentially and the data is shifted through these registers and outputted in sequential fashion. However, an arrangement may be adopted in which one block of data is accumulated temporarily in each of the vertical-direction registers and these items of data are directly applied to the transfer registers 127 corresponding to these vertical-direction registers 126. In this case, it is preferred that the output order of the data from the transfer registers be made the opposite of that in the above-described embodiment, whereby the data will enter the CPU 115 in an order conforming to the scanning direction of the picture.

Further, the positions of the blocks can be staggered as illustrated in FIG. 12*b*. In this case, inputs to the 21-bit transfer register 127 are allowed or inhibited depending upon whether a block is in an odd-numbered column or an even-numbered column. Staggering the positions of the blocks in the horizontal or vertical direction makes it possible to deal even with subjects having a rounded shape.

Furthermore, the position of the main subject in the photographic area can be ascertained on the basis of the luminance distribution of the subject, which is based upon the luminance data, or the distribution of distance to the subject, which is based upon the focusing control data. Ascertaining the position of the main subject makes it possible to perform photometry predominantly of the main subject, as illustrated in FIG. 12*c.* In this case, the effective region HY in the horizontal direction and the effective region VY in the vertical direction are determined in such a manner that photometry predominantly of the main subject will be carried out.

As in the first embodiment, only the data in blocks in which the luminance data is not saturated is selected from the luminance data obtained in block units, a photometric value is calculated based on the selected luminance data, the diaphragm 104 is controlled and so is the shutter speed of the CCD 106.

Only the data in unsaturated blocks is selected from the focusing control data of the image pick-up lens 103 obtained in block units, the total sum of the selected data is obtained and the focusing control of the image pick-up lens 103 is carried out based upon this summed data. In order to perform focusing control, the image pick-up lens 103 is moved forward 10 $\mu$m at a time, during which time the photography and accumulation of data are carried out at least six times (i.e., in the B-field interval of each frame interval over six frame intervals) at each position. The first item of added data for focusing is obtained at the aforesaid initial position (where the amount of feed of the image pick-up lens is equal to 0 $\mu$m). In the next frame interval, the second item of summed data for focusing is obtained at a position at which the image pick-up lens 103 has been fed from the initial position by 10 $\mu$m (i.e., where the amount of feed of the image pick-up lens is equal to 10 $\mu$m). Similarly, third through sixth items of summed data for focusing are obtained while the image pick-up lens 103 is fed 10 $\mu$m at a time. The six items of summed data thus obtained are stored in a predetermined area of the memory, as shown in FIG. 17.

Figure 18:
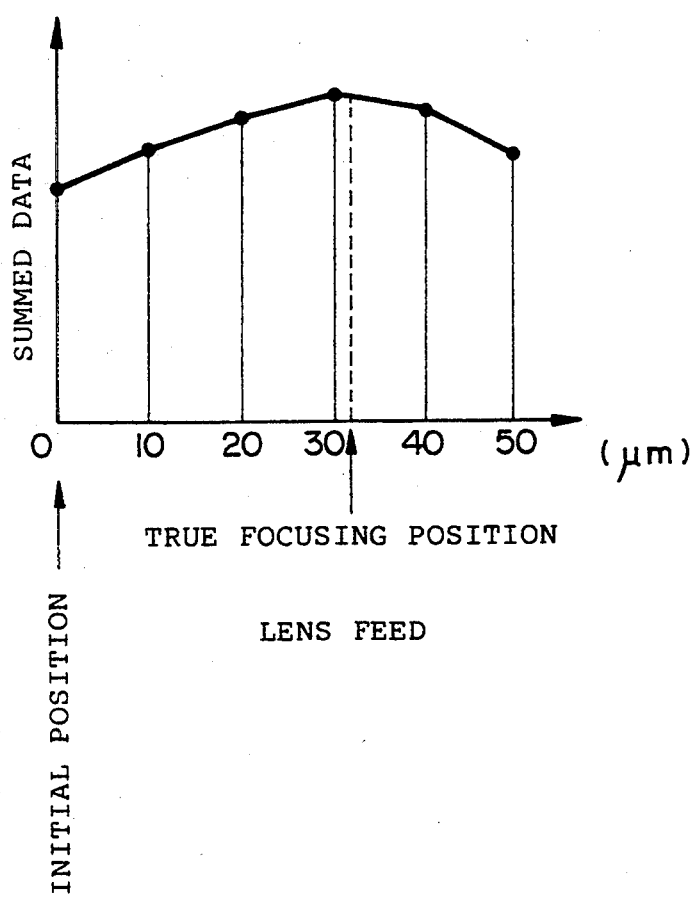
FIG. 18 shows a graphical representation of data stored in the memory depicted in FIG. 17.

FIG. 18 is a graphical representation of the summed data for focusing at the six positions shown in FIG. 17. The initial position of the image pick-up lens 103 is slightly short of the true focused position. The image pick-up lens 103 is fed from this position 10 $\mu$m at a time to obtain the summed data for focusing at each position. The integrated value of the high-frequency signals contained in the video data becomes maximum at the true focused position. Since the unit amount of feed of the image pick-up lens 103 is 10 $\mu$m, which is a very minute distance, the error will be extremely small even if the position at which the summed data for focusing indicates the maximum value is regarded as the true focused position. Accordingly, highly precise focusing can be achieved by positioning the image pickup lens 103 at the position at which the summed data for focusing indicates the maximum value.

As many apparently widely different embodiments of the present invention can be made without departing from the spirit and scope thereof, it is to be understood that the invention is not limited to the specific embodiments thereof except as defined in the appended claims.

What is claimed is:

1. A video camera having an image pick-up optical system which includes a solid-state electronic image sensing device for converting an incident light image into a video signal and for outputting the video signal, comprising:

split photometric-area setting means for setting a plurality of split photometric areas in each of horizontal and vertical directions by setting a plurality of horizontal photometric intervals within an interval in a horizontal scanning direction of the solid-state electronic image sensing device and a plurality of vertical photometric intervals within an interval in a vertical scanning direction of the solid-state electronic image sensing device;

luminance-signal extracting means for extracting a luminance-signal component from the video signal output by the solid-state electronic image sensing device;

integrating means for integrating the luminance-signal component, which has been extracted by said luminance-signal extracting means, over a horizontal integration interval designated by an applied integration control signal and for outputting an integrated signal representing an integrated value resulting from the integration;

integration control means for outputting, for every split photometric area, the integration control signal that designates, as an integration interval, a horizontal photometric interval of a split photometric area that is being scanned and for applying the integration control signal to said integrating means; and photometric-value calculating means for summing, in every split photometric area, and over a corresponding vertical photometric interval, integrated values obtained from said integrating means and for calculating a photometric value for every split photometric area based upon a value obtained by summing the integrated values.

2. The video camera according to claim 1, wherein said integration control means outputs an integration control signal that designates a horizontal photometric interval of one split photometric area in one horizontal scan.

3. The video camera according to claim 1, further comprising:

A/D converting means for converting the integrated signal outputted by said integrating means into digital data; and A/D conversion control means for performing control in such a manner that the data conversion by said A/D converting means is carried out in a horizontal scanning interval that follows a horizontal scanning interval in which a corresponding integration operation by said integrating means was performed.

4. The video camera according to claim 1, wherein said photometric-value calculating means calculates a photometric value with regard to a group of split photometric areas composed of a predetermined combination of a plurality of split photometric areas.

5. The video camera according to claim 1, further comprising exposure control means for deciding exposure conditions based upon photometric values of a plurality of split photometric areas calculated by said photometric-value calculating means.

6. The video camera according to claim 1, wherein said photometric-value calculating means calculates photometric values regarding respective ones of a plurality of groups of split photometric areas, each group being composed of a predetermined combination of a plurality of split photometric areas, said camera further comprising exposure control means for deciding exposure conditions based upon the photometric values of the plurality of groups of split photometric areas calculated by said photometric-value calculating means.

7. A photometric method for a video camera, comprising the steps of:

setting a plurality of split photometric areas in each of horizontal and vertical directions by setting a plurality of horizontal photometric intervals within an interval in a horizontal scanning direction of a solid-state electronic image sensing device, which converts an incident light image into a video signal and outputs the video signal, and a plurality of vertical photometric intervals within an interval in a vertical scanning direction of the solid-state electronic image sensing device;

designating, by an integration control signal, and as an integration interval, a horizontal photometric interval of a split photometric area that is being scanned; extracting a luminance-signal component from the video signal output by the solid-state electronic image sensing device and integrating the luminance-signal component over the horizontal integration interval designated by the integration control signal; and summing, in every split photometric area, and over a corresponding vertical photometric interval, integrated values obtained by the integration and calculating a photometric value for every split photometric area based upon a value obtained by summing the integrated values.

8. The photometric method according to claim 7, wherein the integration control signal designates a horizontal photometric interval of one split photometric area in one horizontal scan.

9. The photometric method according to claim 7, further comprising a step of converting an integrated signal, which represents an integrated value, into digital data in a horizontal scanning interval that follows a corresponding horizontal scanning interval in which the integration operation was performed.

10. The photometric method according to claim 7, wherein said step of calculating a photometric value includes a step of calculating a photometric value with regard to a group of split photometric areas composed of a predetermined combination of a plurality of split photometric areas.

11. The photometric method according to claim 7, further comprising a step of deciding exposure conditions based upon photometric values of a plurality of split photometric areas calculated during said step of calculating a photometric value.

12. The photometric method according to claim 7, wherein said step of calculating a photometric value includes a step of calculating photometric values regarding respective ones of a plurality of groups of split photometric areas, each group being composed of a predetermined combination of a plurality of split photometric areas, the photometric method further comprising a step of deciding exposure conditions based upon the photometric values of the plurality of groups of split photometric areas calculated during said step of calculating a photometric value.

13. A video camera comprising:
a solid-state electronic image sensing device for photographing a subject and for outputting a video signal representing the subject;
block setting means for subdividing any area within a photographic area of said solid-state electronic image sensing device into a plurality of blocks;
adding means for summing each video signal, which is output by said solid-state electronic image sensing device, in a range of a horizontal scanning interval and a vertical scanning interval corresponding to each block that has been set by said block setting means and for outputting a summed video signal for every block; and
exposure control means for deciding exposure conditions based upon the summed video signals of the plurality of blocks output by said adding means.

14. A video camera comprising:
a solid-state electronic image sensing device for photographing a subject and for outputting a video signal representing the subject;
block setting means for subdividing any area within a photographic area of said solid-state electronic image sensing device into a plurality of blocks;
luminance-signal component extracting means for extracting a component relating to a luminance signal from the video signal output by said solid-state electronic image sensing device;
adding means for summing each component relating to the luminance signal output by said luminance-signal component extracting means in a range of a horizontal scanning interval and a vertical scanning interval corresponding to each block set by said block setting means and for outputting a summed luminance-signal component for every block; and
photometric value calculating means for calculating a photometric value based upon a summed luminance-signal component, which corresponds to a prescribed block, from among the summed luminance-signal components output by said adding means.

15. An image pick-up apparatus having an image pick-up optical system which includes a solid-state electronic image sensing device for converting an incident light image into a video signal and for outputting the video signal and an image pick-up lens for forming an image of a subject on said solid-state electronic image sensing device, the image pick-up apparatus comprising:
block setting means for subdividing any area within a photographic area of said solid-state electronic image sensing device into a plurality of blocks;
high-frequency signal component extracting means for extracting a high-frequency signal component for focusing control from the video signal output by said solid-state electronic image sensing device;
adding means for summing each high-frequency signal component, which is output by said high-frequency signal component extracting means, in a range of a horizontal scanning interval and a vertical scanning interval corresponding to each block that has been set by said block setting means and for outputting a summed high-frequency signal component for every block; and
focusing control means for performing focusing control of said image pick-up lens based upon a summed high-frequency signal component, which corresponds to a prescribed block, from among the summed high-frequency signal components output by said adding means.

16. An image pick-up apparatus comprising:
photographic means for photographing a subject and outputting image data representing the subject;
a horizontal accumulating circuit for summing image data, which is output by said photographic means, for every horizontal scanning region of blocks formed by subdividing any area within a photographic area of said photographic means into a plurality of blocks and for outputting, block by block, horizontal sum data obtained by the summing;
a vertical accumulating circuit having first memories, a number of which corresponding to a number of blocks formed in a horizontal direction within the photographic area, and an adding circuit for adding the horizontal sum data, which is output by said horizontal accumulating circuit block by block, to stored data in a corresponding first memory, the addition being repeated in a vertical scanning region of one block; and
second memories, a number of which corresponding to the number of blocks formed in the horizontal direction within the photographic area, for accepting, block by block, results of accumulation regarding the vertical scanning region of one block obtained by said vertical accumulating circuit, for temporarily storing the results and for successively outputting the results at fixed intervals.

17. A multiple split-image information generating apparatus for generating accumulated image information for every block of blocks obtained by subdividing a prescribed area in one frame into a plurality of blocks in horizontal and vertical directions using one frame of inputted image data, comprising:
a horizontal accumulating circuit for summing input image data for every horizontal scanning region of one block and for outputting horizontal sum data block by block;
a vertical accumulating circuit having first memory circuits, a number of which corresponding to a number of blocks in the horizontal direction, and an adding circuit for adding the horizontal sum data, which is output by said horizontal accumulating circuit block by block, to stored data in a corresponding one of said first memory circuits, the addition being repeated in a vertical scanning region of one block; and
second memory circuits, a number of which corresponding to the number of blocks in the horizontal direction, for accepting, block by block, results of accumulation regarding the vertical scanning region of one block obtained by said vertical accumulating circuit, for temporarily storing the results and for successively outputting the results at fixed intervals.

18. An image pick-up method for a video camera comprising the steps of:

subdividing any area within a photographic area of a solid-state electronic image sensing device into a plurality of blocks;

photographing a subject using the solid-state electronic image sensing device and obtaining a video signal, which represents the subject, from the solid-state electronic image sensing device;

summing each obtained video signal in a range of a horizontal scanning interval and a vertical scanning interval corresponding to each block obtained by subdivision and outputting a summed video signal for every block; and controlling exposure of the solid-state electronic image sensing device on the basis of the summed video signals of the blocks.

19. A photometric method comprising the steps of:

subdividing any area within a photographic area of a solid-state electronic image sensing device into a plurality of blocks;

photographing a subject using the solid-state electronic image sensing device and obtaining a video signal, which represents the subject, from the solid-state electronic image sensing device;

extracting a component relating to a luminance signal from the video signal obtained;

summing each component relating to the extracted luminance signal in a range of a horizontal scanning interval and a vertical scanning interval corresponding to each block obtained from subdivision and obtaining a summed luminance-signal component for every block; and producing a signal representing a photometric value, which is indicative of brightness of the subject, based upon a summed luminance-signal component, which corresponds to a prescribed block, from among the summed luminance-signal components obtained.

20. A focusing control method for an image pick-up apparatus having an image pick-up optical system which includes a solid-state electronic image sensing device for converting an incident light image into a video signal and outputting the video signal and an image pick-up lens for forming an image of a subject on the solid-state electronic image sensing device, said focusing control method comprising the steps of:

subdividing any area within a photographic area of the solid-state electronic image sensing device into a plurality of blocks;

extracting a high-frequency signal component for focusing control from the video signal output by the solid-state electronic image sensing device;

adding each extracted high-frequency signal component in a range of a horizontal scanning interval and a vertical scanning interval corresponding to each block obtained by subdivision and outputting a summed high-frequency signal component for every block; and performing focusing control of the image pick-up lens based upon a summed high-frequency signal component, which corresponds to a prescribed block, from among the summed high-frequency signal components obtained.

* * * * *